US011641518B2

(12) United States Patent
Eshita

(10) Patent No.: US 11,641,518 B2
(45) Date of Patent: May 2, 2023

(54) INFORMATION PROCESSING APPARATUS AND INFORMATION PROCESSING METHOD

(71) Applicant: SONY GROUP CORPORATION, Tokyo (JP)

(72) Inventor: Shiro Eshita, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/603,809

(22) PCT Filed: Mar. 25, 2020

(86) PCT No.: PCT/JP2020/013472
§ 371 (c)(1),
(2) Date: Oct. 14, 2021

(87) PCT Pub. No.: WO2020/217835
PCT Pub. Date: Oct. 29, 2020

(65) Prior Publication Data
US 2022/0201198 A1 Jun. 23, 2022

(30) Foreign Application Priority Data

Apr. 26, 2019 (JP) .............................. JP2019-085061

(51) Int. Cl.
H04N 5/232 (2006.01)
H04W 4/80 (2018.01)
(Continued)

(52) U.S. Cl.
CPC ..... H04N 5/23222 (2013.01); H04N 5/23229 (2013.01); H04N 5/232939 (2018.08);
(Continued)

(58) Field of Classification Search
CPC ........... H04N 5/23222; H04N 5/23229; H04N 5/232939; H04N 5/77; H04N 5/232945;
(Continued)

(56) References Cited

U.S. PATENT DOCUMENTS

2008/0093447 A1* 4/2008 Johnson ............... H04B 5/0056
235/383
2012/0322374 A1 12/2012 Yamaoka et al.
(Continued)

FOREIGN PATENT DOCUMENTS

CN 102783041 A 11/2012
EP 2660988 A1 11/2013
(Continued)

OTHER PUBLICATIONS

International Search Report and Written Opinion of PCT Application No. PCT/JP2020/013472, dated Jun. 23, 2020, 08 pages of ISRWO.

Primary Examiner — Nelson D. Hernández Hernández
(74) Attorney, Agent, or Firm — Chip Law Group

(57) ABSTRACT

Provided is an apparatus and a method that enable alignment for communication, in which short-range wireless communication is performed, to be performed easily and with high accuracy. The apparatus and the method include a control unit that displays, on a display unit, an image to be presented to a user at a time of aligning a position of a communication unit of the self-apparatus that performs short-range wireless communication with a position of a communication unit of a communication counterpart apparatus. The control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the
(Continued)

self-apparatus. The control unit displays outline data or transparent data for the alignment image on the display unit.

15 Claims, 17 Drawing Sheets

(51) Int. Cl.
  *H04N 5/77* (2006.01)
  *H04N 7/18* (2006.01)
(52) U.S. Cl.
  CPC ............... *H04N 5/77* (2013.01); *H04N 7/185* (2013.01); *H04W 4/80* (2018.02)
(58) Field of Classification Search
  CPC ...... H04N 5/272; H04N 5/2328; H04N 7/185; H04W 4/80; G09G 5/00; G09G 5/36; G09G 5/377
  See application file for complete search history.

(56) References Cited

U.S. PATENT DOCUMENTS

| | | | |
|---|---|---|---|
| 2013/0141567 A1* | 6/2013 | Walker | H04B 5/00 348/135 |
| 2014/0168012 A1* | 6/2014 | Mankowski | H04W 4/20 342/359 |

FOREIGN PATENT DOCUMENTS

| | | |
|---|---|---|
| JP | 2005-026873 A | 1/2005 |
| JP | 2008-153998 A | 7/2008 |
| JP | 2015-005952 A | 1/2015 |
| JP | 2015-008374 A | 1/2015 |
| WO | 2012/090494 A1 | 7/2012 |

* cited by examiner

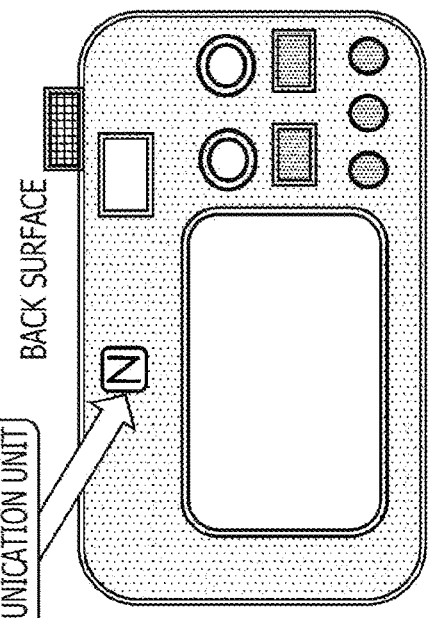
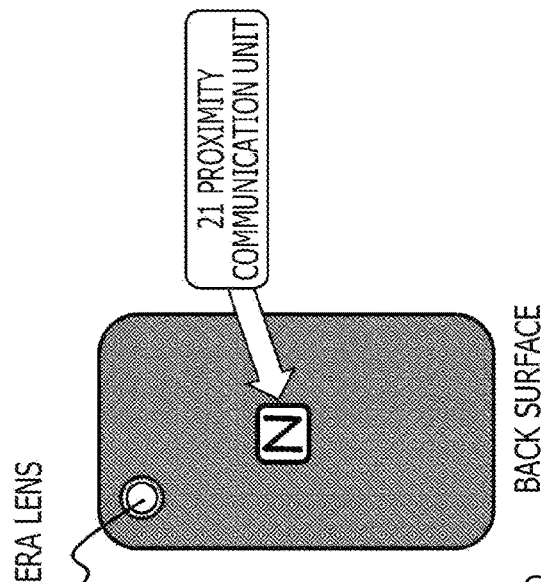
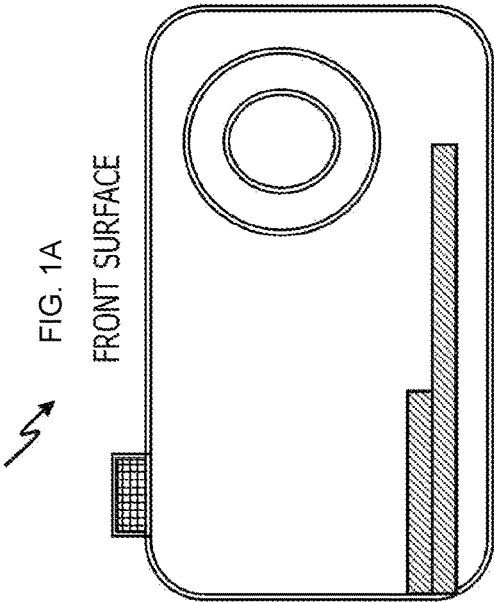
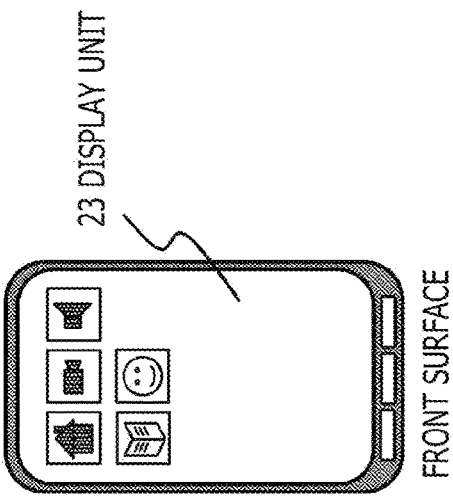

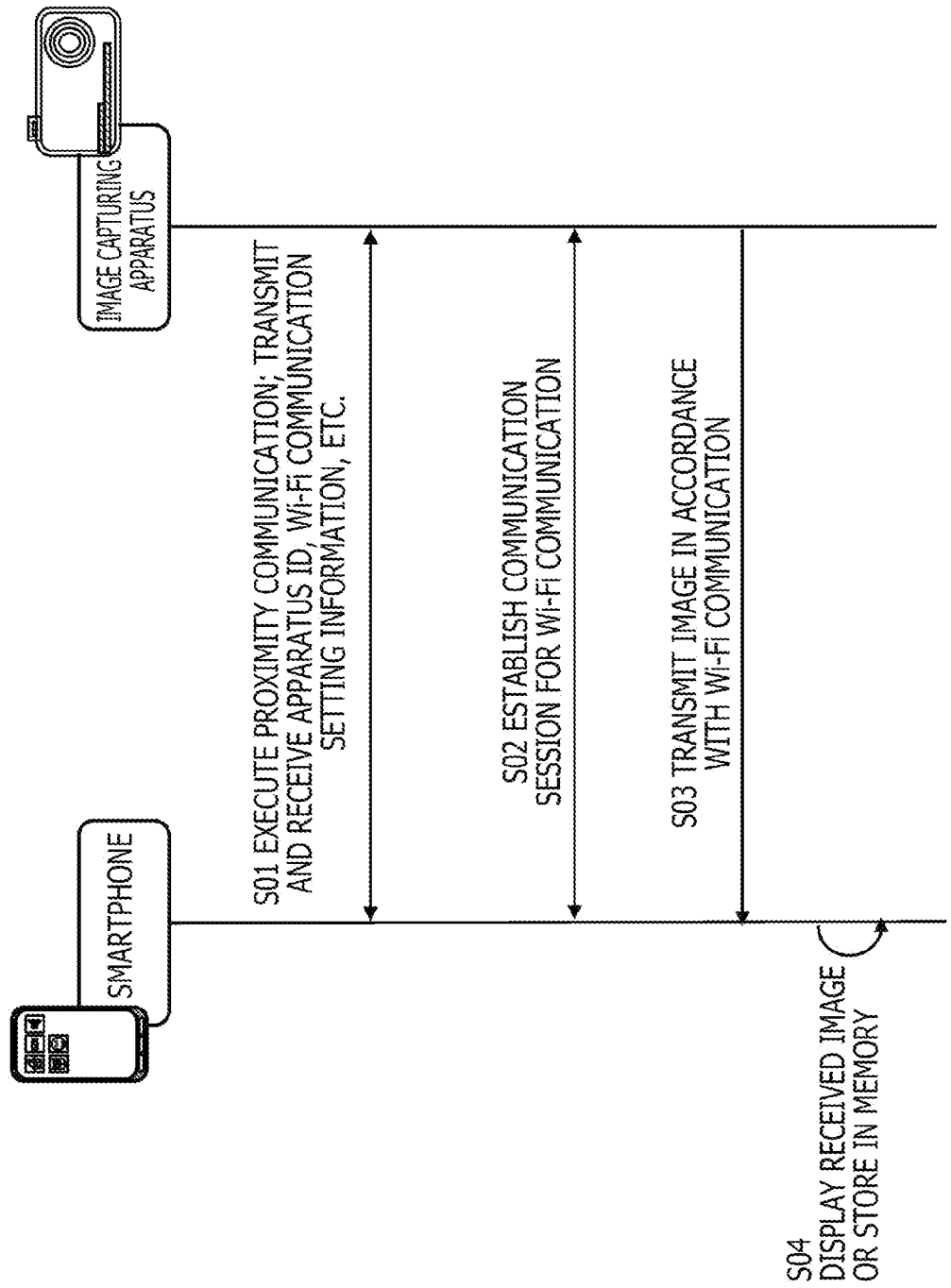

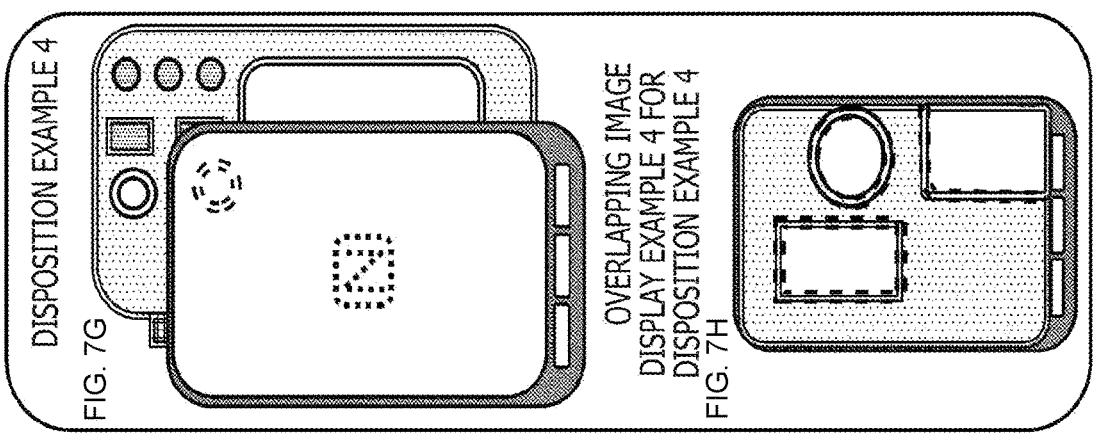
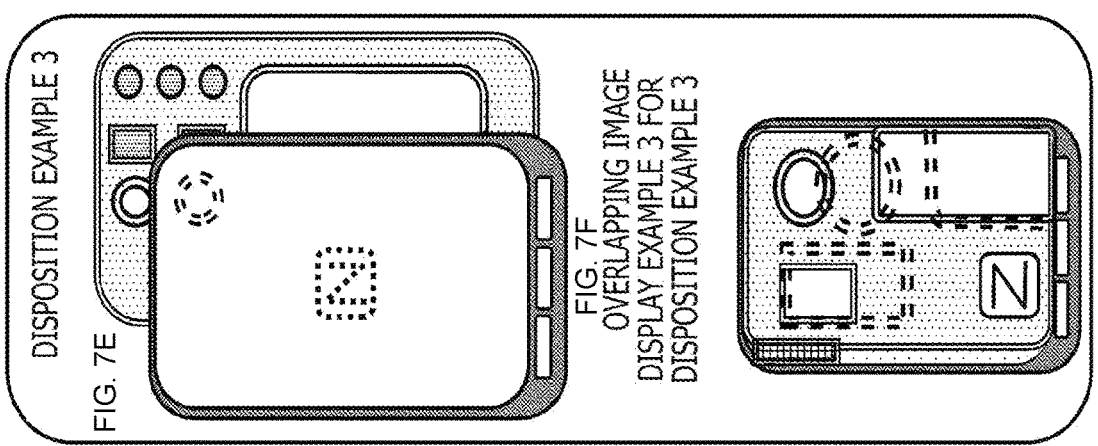
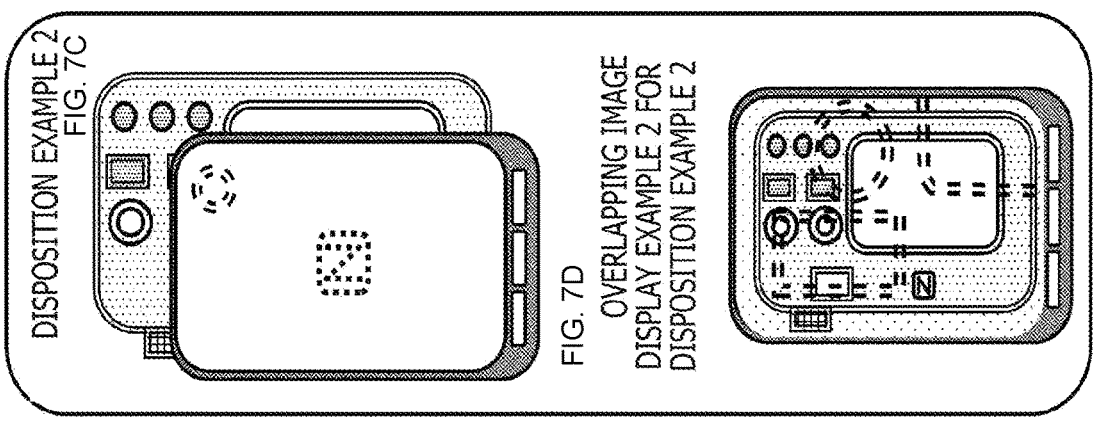
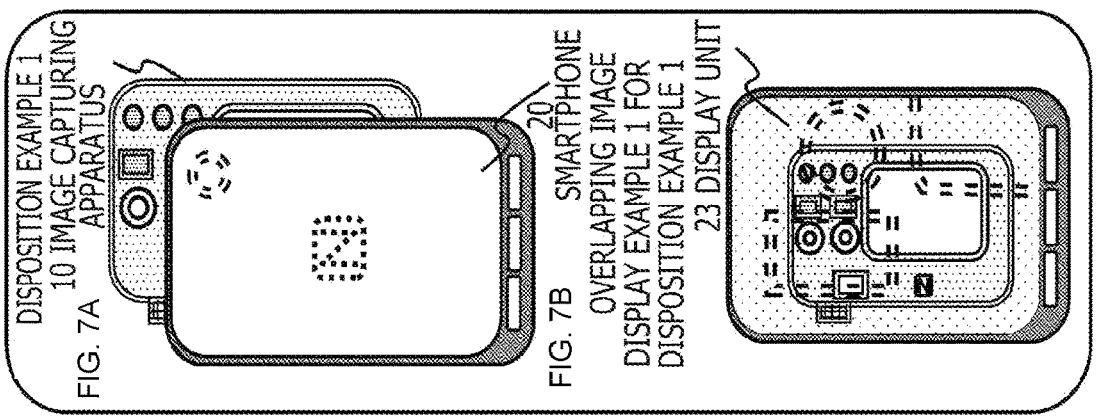

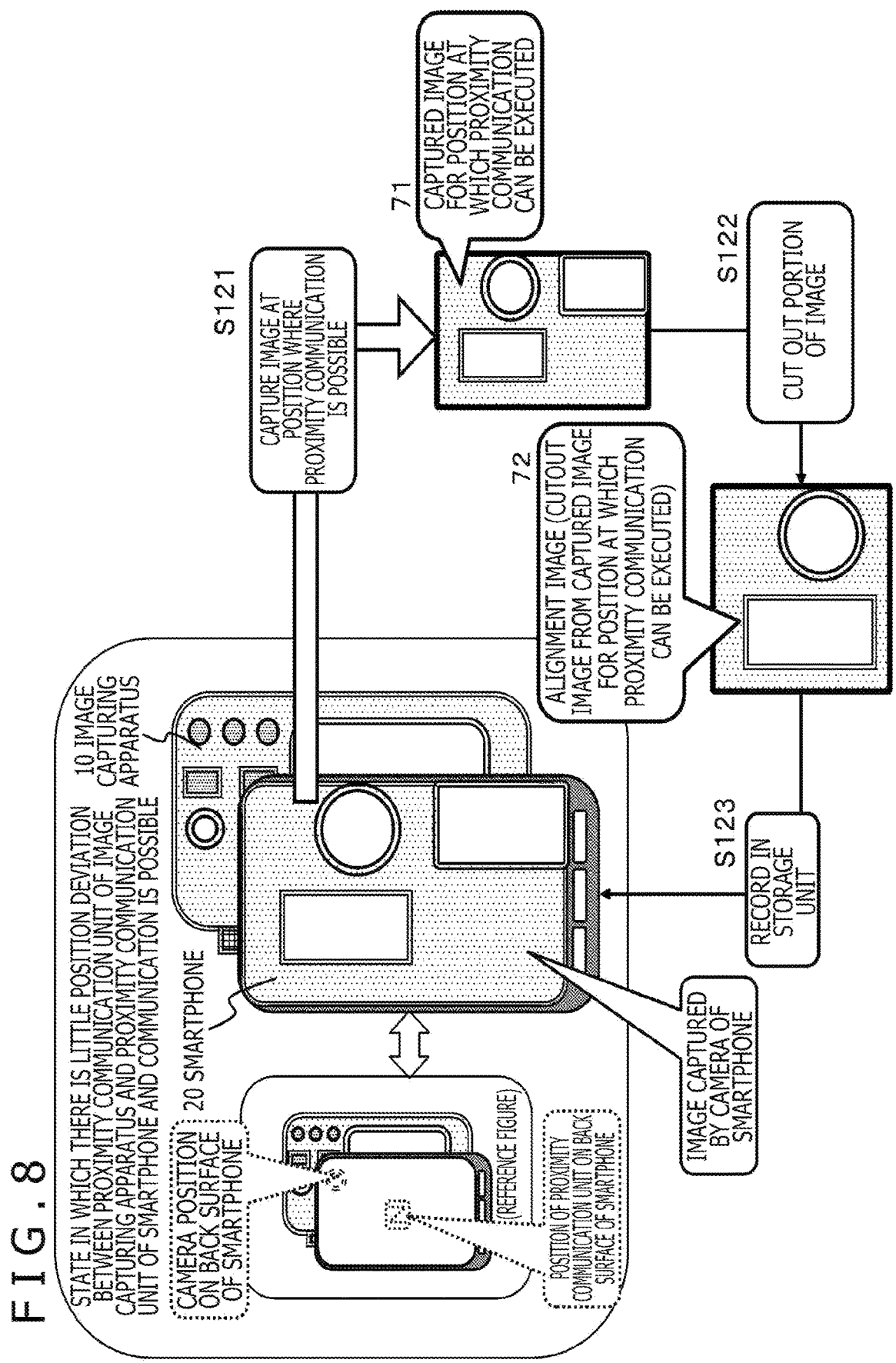

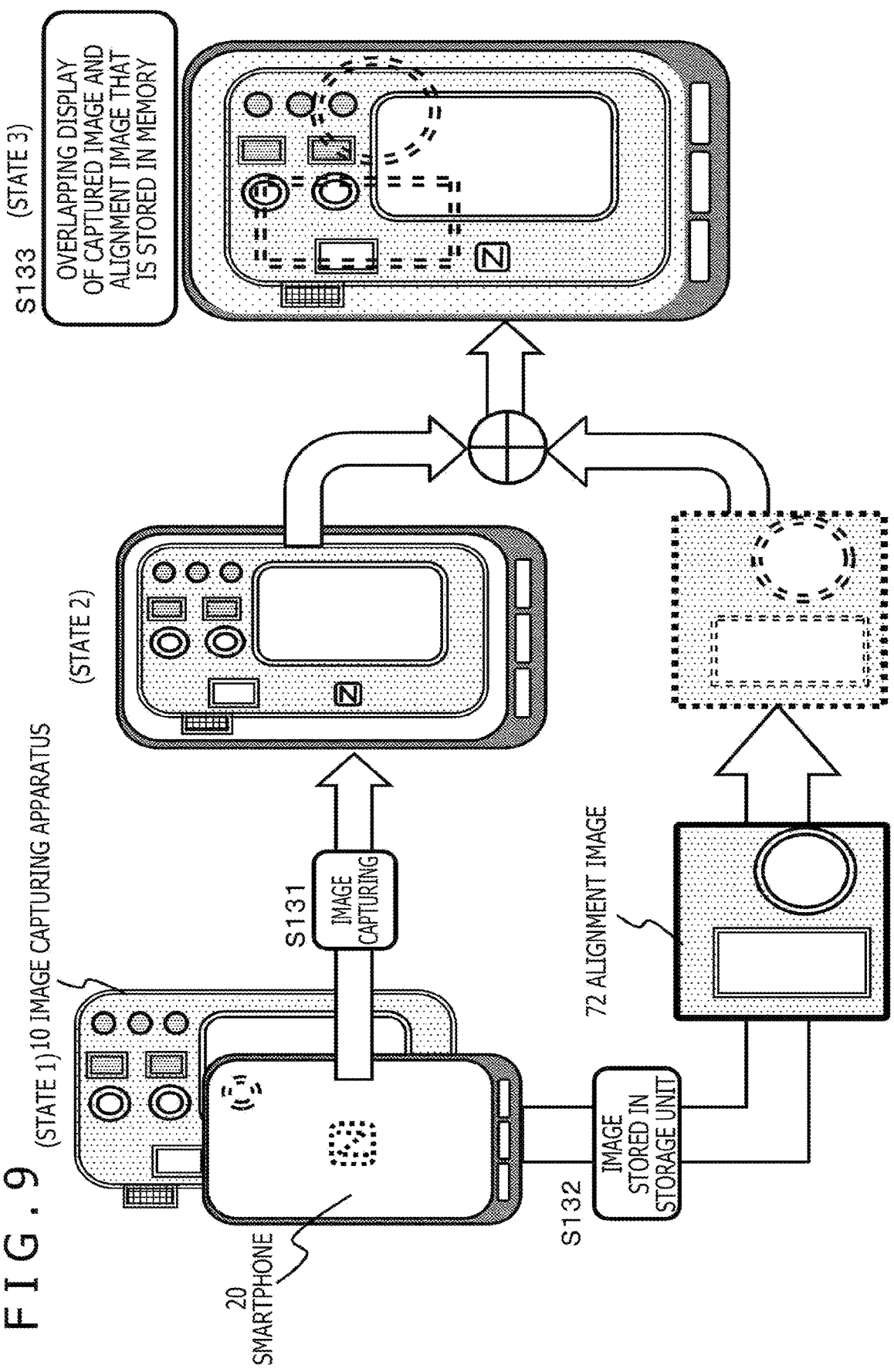

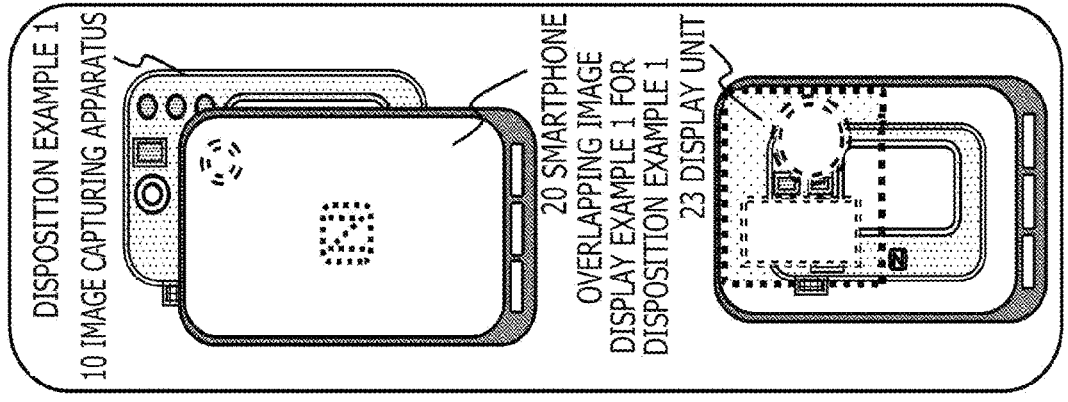
FIG. 10G / FIG. 10H / FIG. 10E / FIG. 10F
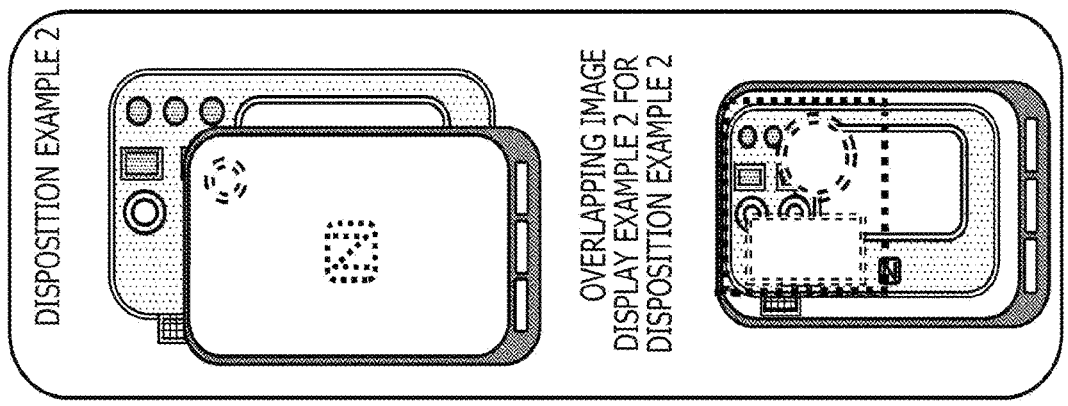
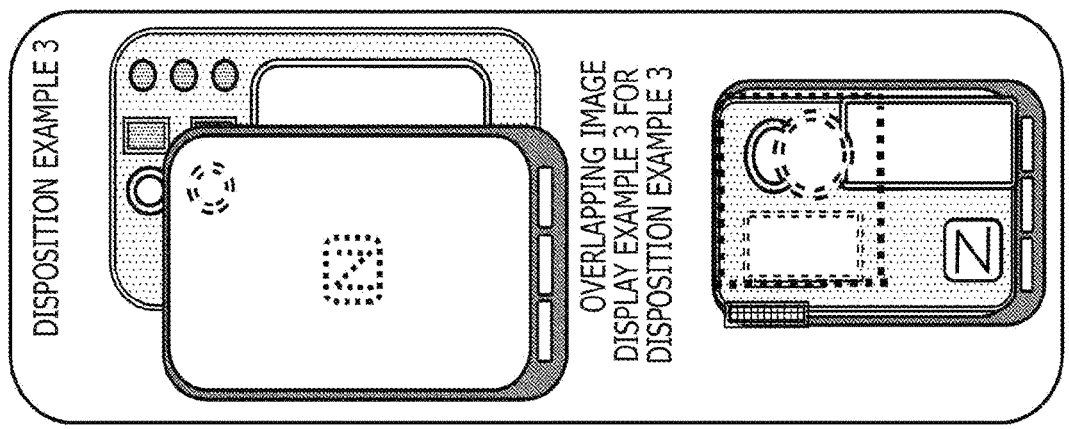
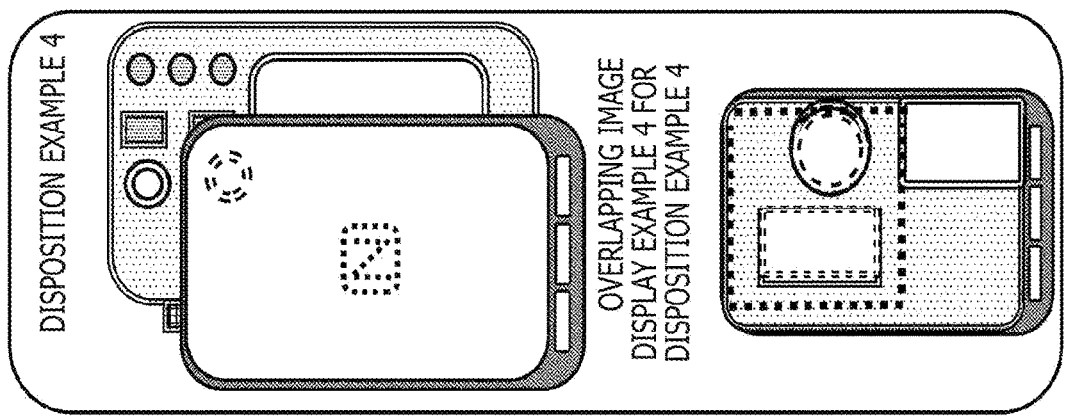
FIG. 10A / FIG. 10B

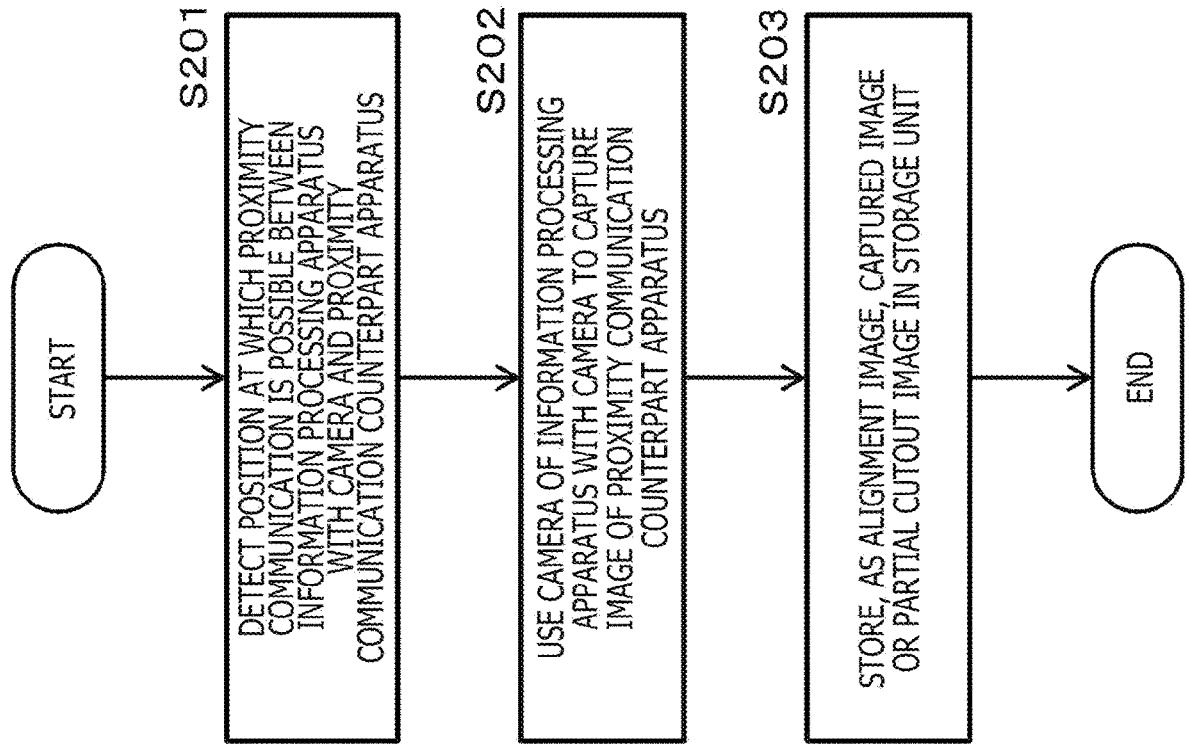

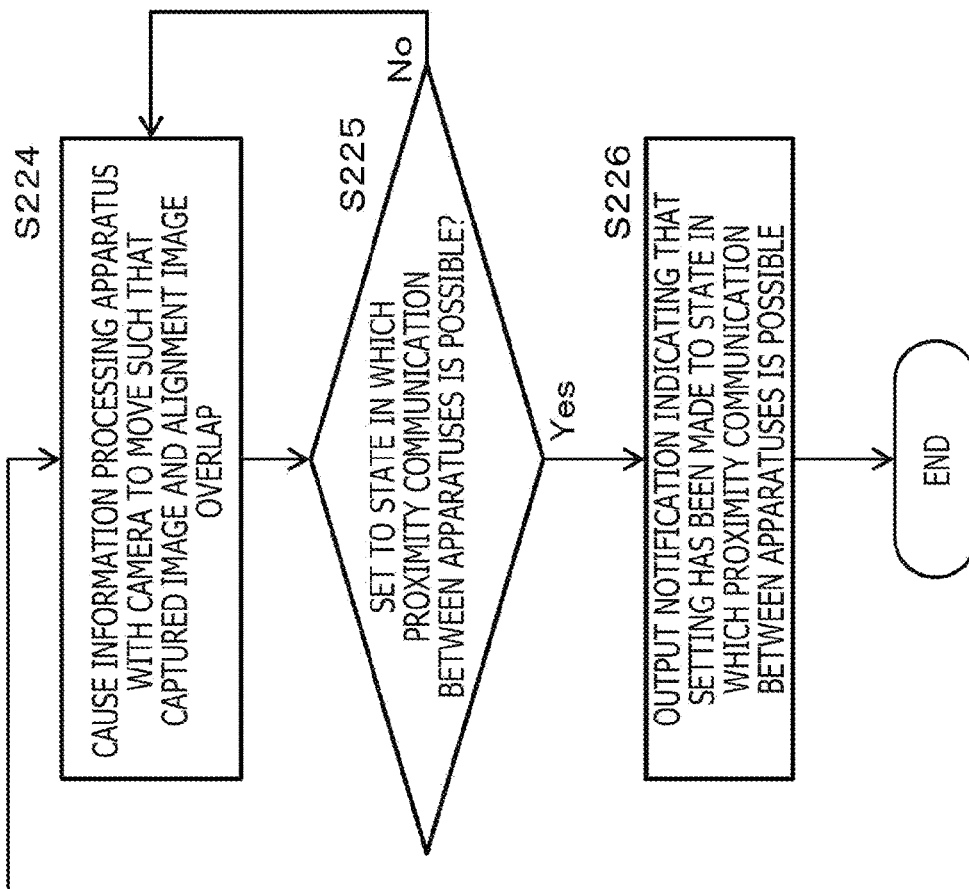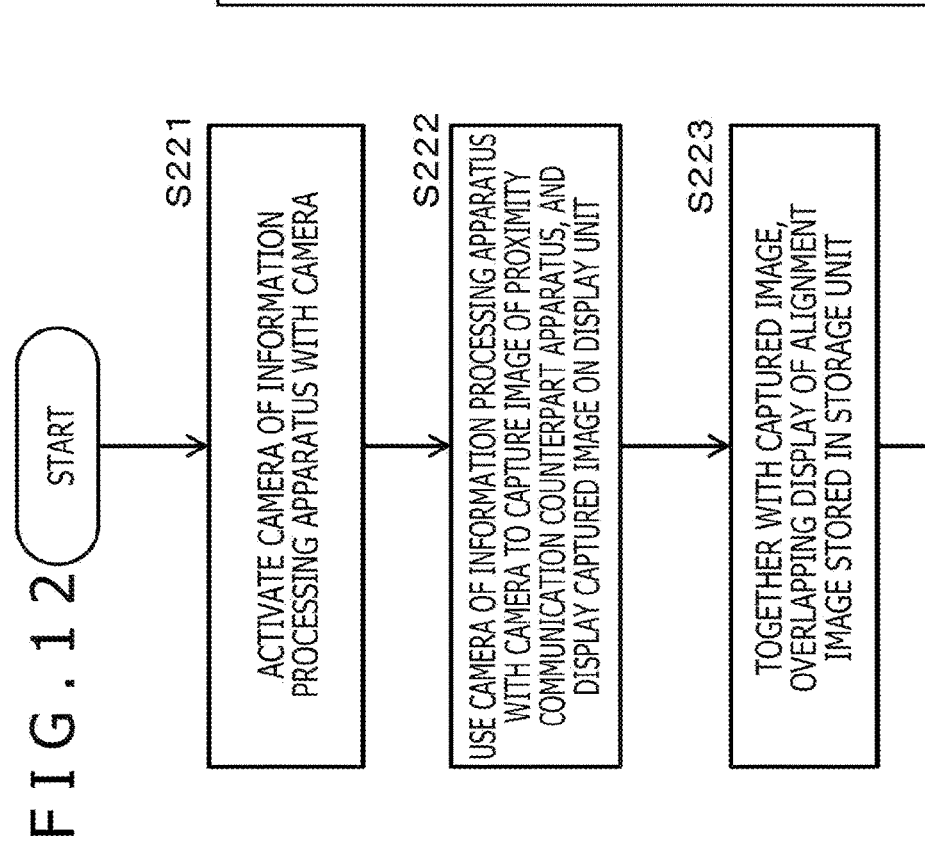

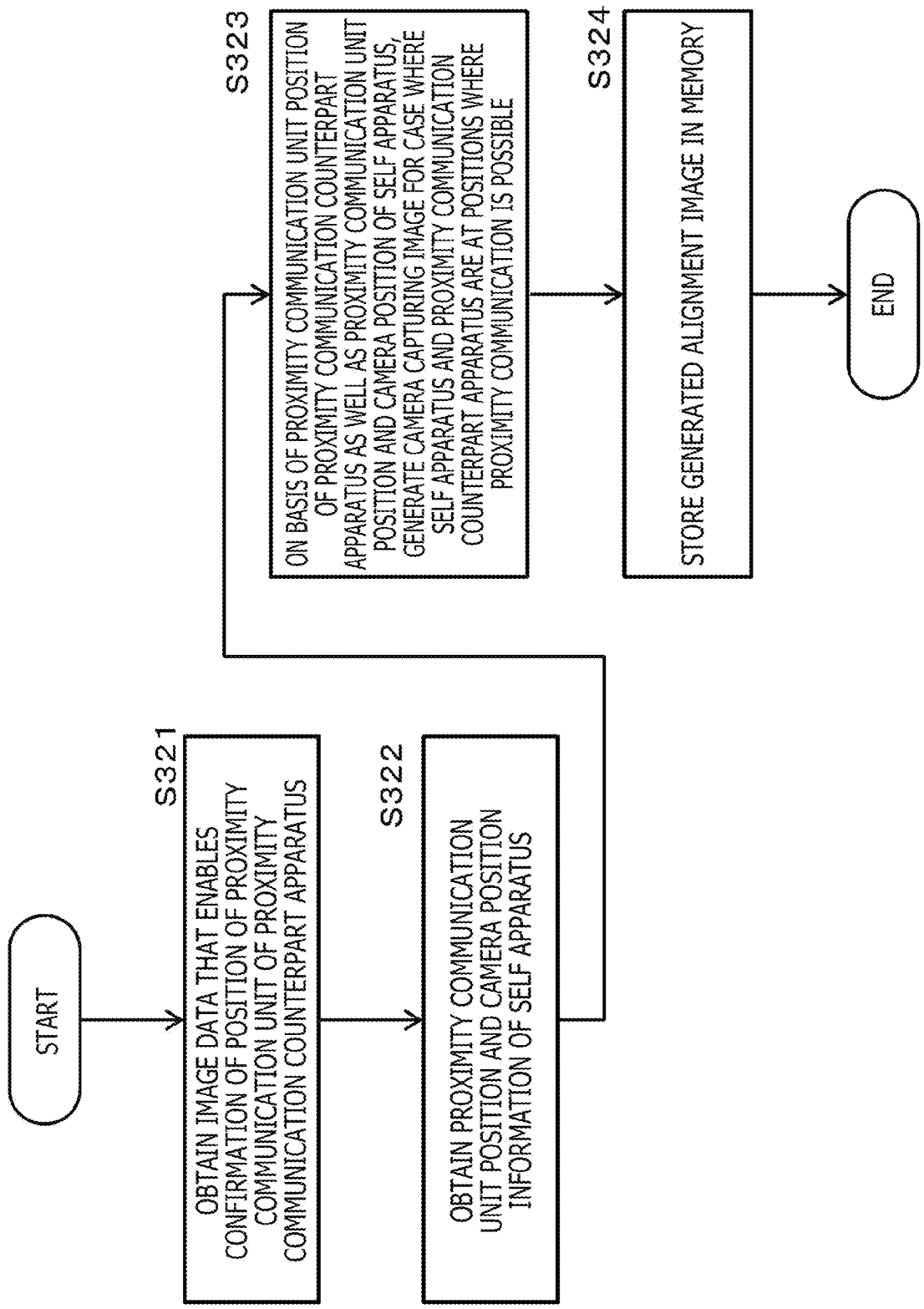

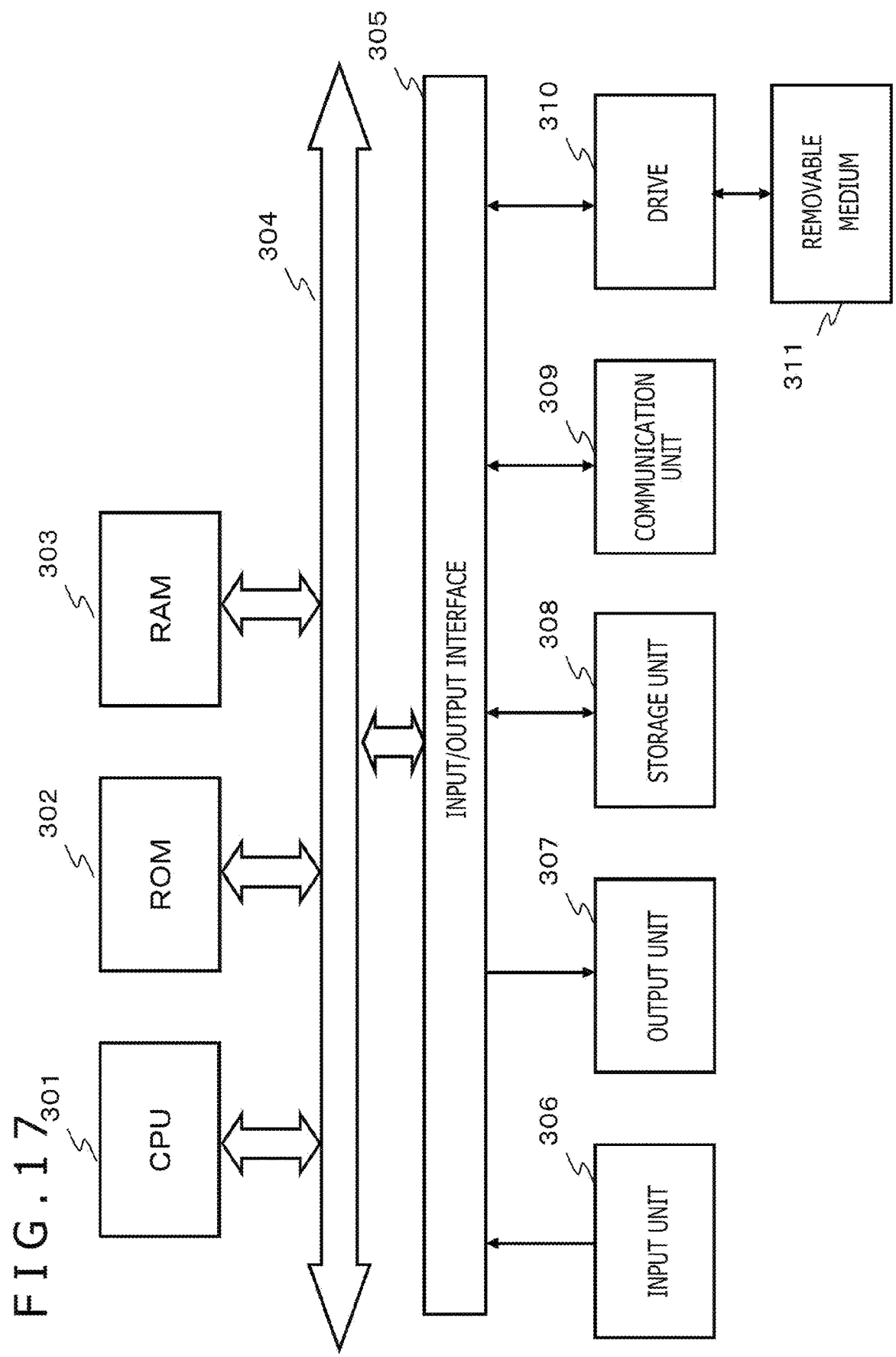

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/013472 filed on Mar. 25, 2020, which claims priority benefit of Japanese Patent Application No. JP 2019-085061 filed in the Japan Patent Office on Apr. 26, 2019. Each of the above-referenced applications is hereby incorporated herein by reference in its entirety.

TECHNICAL FIELD

The present disclosure relates to an information processing apparatus, an information processing method, and a program. In more detail, the present disclosure relates to an information processing apparatus, an information processing method, and a program that, in a case in which short-range wireless communication is to be performed between two apparatuses, enable alignment between communication units of the apparatuses to be easily performed with high accuracy.

BACKGROUND ART

For example, in a case of performing processing such as transferring an image captured by a camera to a smartphone or a tablet terminal, processing such as the following is executed.

Respective proximity communication units of two apparatuses that will communicate with each other, through communication that uses proximity communication units that perform short-range wireless communication such as NFC (Near Field Communication), for example, perform authentication processing, and subsequently transmit and receive setting information necessary for Wi-Fi communication, for example, a password, encryption key information, or the like.

Subsequently, a Wi-Fi communication session capable of transmitting a large amount of data is established between the two apparatuses, and data such as an image is transmitted by Wi-Fi communication.

By performing such two-step communication described above, transmission of data for which a password has been set or encrypted data becomes possible when communicating by Wi-Fi, and it is possible to prevent data leaking to the apparatus of a third party.

A greater number of recent cameras, smartphones, tablet terminals, or other information processing apparatuses are provided with an NFC type or other type of proximity communication unit.

However, the communicable range of this NFC type or other type of proximity communication unit is less than or equal to several cm, and a device provided with a communication unit that has weak output cannot perform good communication unless in an approximately close-contact state.

For example, devices such as a camera or a smartphone each has a mark indicating the position of an antenna for a proximity communication unit, but when the camera and the smartphone are brought into close contact, the marks of both proximity communication units thereof may not be visible externally.

As a result, it becomes more likely for a situation to occur in which the two devices are brought into close contact in a state in which there is a deviation between the positions for the antennas which are communication units for the camera and the smartphone, and short-range wireless communication between the devices cannot be performed in this case.

As a conventional technique for avoiding this problem, there is the technique described in PTL 1 (JP 2015-005952A), for example.

PTL 1 discloses, as an example of a configuration for easily aligning antennas that are communication units for short-range wireless communication, a configuration in which short-range wireless communication is performed between an electronic device such as a smartphone and an image forming apparatus such as a copy apparatus.

Specifically, the smartphone is caused to capture an image indicating the position of the antenna of the copy apparatus and store the image in a storage unit. Subsequently, a live image captured by the smartphone is caused to be displayed on a display unit of the smartphone, and a proximity communication unit (antenna) of the copy apparatus is approached.

In a case where the image illustrating the antenna position of the copy apparatus that has been stored in the storage unit is detected in the live image, an emphasized display of the antenna image by the display unit is performed. This is a configuration that, by this processing, enables a user to confirm the antenna position of the copy apparatus and that makes it easier to make the antenna positions of both devices match.

By this configuration, a user who moves the smartphone can know the antenna position of the copy apparatus on the basis of the image displayed on the smartphone display unit. However, a problem with this configuration is that the user cannot reliably know the antenna position on the smartphone side.

In many cases, the mark indicating the position of the smartphone's antenna is recorded on the back side of the smartphone, and when the back side of the smartphone is facing the copy apparatus side, the user cannot see this mark. In addition, in a case where a cover is mounted so as to cover the back surface of the smartphone, the antenna mark cannot be confirmed even if the smartphone is turned over. Therefore, the user cannot know the position of the smartphone's antenna, and as a result may find it difficult to cause the position of the smartphone's antenna to match the position of the copy apparatus's antenna.

CITATION LIST

Patent Literature

[PTL 1]
JP 2015-005952A

SUMMARY

Technical Problem

The present disclosure, for example, is made in light of the problems described above, and provides an information processing apparatus, an information processing method, and a program that, in a case in which short-range wireless communication is to be performed between two information processing apparatuses, enable alignment of positions of antennas which are each a communication unit of a device to be performed easily and with high accuracy.

Solution to Problem

A first aspect of the present disclosure is an information processing apparatus including a control unit that displays on a display unit an image to be presented to a user at a time of aligning a position of a communication unit of the self-apparatus that performs short-range wireless communication with a position of a communication unit of a communication counterpart apparatus, in which the control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the self-apparatus.

Furthermore, a second aspect of the present disclosure is an information processing apparatus including a control unit that generates an alignment image that is to be presented to a user at a time of aligning a position of a communication unit of the self-apparatus that performs short-range wireless communication with a position of a communication unit of a communication counterpart apparatus, in which the control unit generates, as the alignment image, an image captured by the camera of the self-apparatus at a position where short-range wireless communication between the self-apparatus and the communication counterpart apparatus is possible, or a partial cutout image of this image.

Furthermore, a third aspect of the present disclosure is an information processing method executed at an information processing apparatus, in which the information processing apparatus includes a control unit that displays, on a display unit, an image to be presented to a user at a time of aligning a position of a communication unit of the self-apparatus that performs short-range wireless communication with a position of a communication unit of a communication counterpart apparatus, and the control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the self-apparatus.

Furthermore, a fourth aspect of the present disclosure is an information processing method executed at an information processing apparatus, in which the information processing apparatus includes a control unit that generates an alignment image that is to be presented to a user at a time of aligning a position of a communication unit of the self-apparatus that performs short-range wireless communication with a position of a communication unit of a communication counterpart apparatus, and the control unit generates, as the alignment image, an image captured by a camera of the self-apparatus at a position where short-range wireless communication between the self-apparatus and the communication counterpart apparatus is possible, or a partial cutout image of this image.

Furthermore, a fifth aspect of the present disclosure is a program that causes information processing to be executed in an information processing apparatus, in which the information processing apparatus includes a control unit that displays, on a display unit, an image to be presented to a user at a time of aligning a position of a communication unit of the self-apparatus that performs short-range wireless communication with a position of a communication unit of a communication counterpart apparatus, and the program, at the control unit, causes the display unit to overlappingly display an alignment image captured by a camera of the self-apparatus at a position where short-range wireless communication between the self-apparatus and the communication counterpart apparatus is possible, and a live view image which is a current captured image according to the camera of the self-apparatus.

Furthermore, a sixth aspect of the present disclosure is a program that causes information processing to be executed in an information processing apparatus, in which the information processing apparatus includes a control unit that generates an alignment image that is to be presented to a user at a time of aligning a position of a communication unit of the self-apparatus that performs short-range wireless communication with a position of a communication unit of a communication counterpart apparatus, and the program causes the control unit to generate an image captured by a camera of the self-apparatus at a position where short-range wireless communication between the self-apparatus and the communication counterpart apparatus is possible, or a partial cutout image of this image, as the alignment image.

Note that the program of the present disclosure, for example, can be provided according to a communication medium or a storage medium for providing the program in a computer-readable format to an image processing apparatus or a computer system that is able to execute various types of program code. By providing such a program in a computer-readable format, processing according to the program is realized on the image processing apparatus or the computer system.

Other objectives, features, or advantages of the present disclosure should become clear according to more detailed description based on the embodiments of the present disclosure described below or the attached drawings. Note that a system in the present specification is a logical collective configuration of a plurality of apparatuses, and is not limited to each apparatus of the configuration being inside the same housing.

By virtue of the configuration of an embodiment of the present disclosure, an apparatus and a method that enable alignment for communication, in which short-range wireless communication is performed, to be performed easily and with high accuracy are realized.

Specifically, for example, the apparatus and the method include a control unit that displays, on a display unit, an image to be presented to a user at a time of aligning a position of a communication unit of the self-apparatus that performs short-range wireless communication with a position of a communication unit of a communication counterpart apparatus. The control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the self-apparatus. The control unit displays outline data or transparent data for the alignment image on the display unit.

By the present configuration, an apparatus and a method that enable alignment for communication, in which short-range wireless communication is performed, to be performed easily and with high accuracy are realized.

Note that effects described in the present specification are merely examples and there is no limitation thereto. In addition, there may be additional effects.

BRIEF DESCRIPTION OF DRAWINGS

FIGS. 1A, 1B, 1C, and 1D are views for describing configuration examples of an information processing apparatus.

FIG. 2 is a view for describing an example of processing executed by the information processing apparatus.

FIGS. 7A, 7B, 7C, 7D, 7E, 7F, 7G, and 7H are views for describing an example of processing executed by the information processing apparatus according to the present disclosure.

FIG. 8 is a view for describing an example of processing executed by an image processing apparatus according to the present disclosure.

FIG. 9 is a view for describing an example of processing executed by the information processing apparatus according to the present disclosure.

FIGS. 10A, 10B, 10C, 10D, 10E, 10F, 10G, and 10H are views for describing an example of processing executed by the information processing apparatus according to the present disclosure.

FIG. 11 is a view that illustrates a flow chart for describing a processing sequence executed by the information processing apparatus according to the present disclosure.

FIG. 12 is a view that illustrates a flow chart for describing a processing sequence executed by the information processing apparatus according to the present disclosure.

FIG. 16 is a view that illustrates a flow chart for describing a processing sequence executed by the information processing apparatus according to the present disclosure.

FIG. 17 is a view for describing an example of a hardware configuration of the information processing apparatus according to the present disclosure.

DESCRIPTION OF EMBODIMENTS

Figure 3:
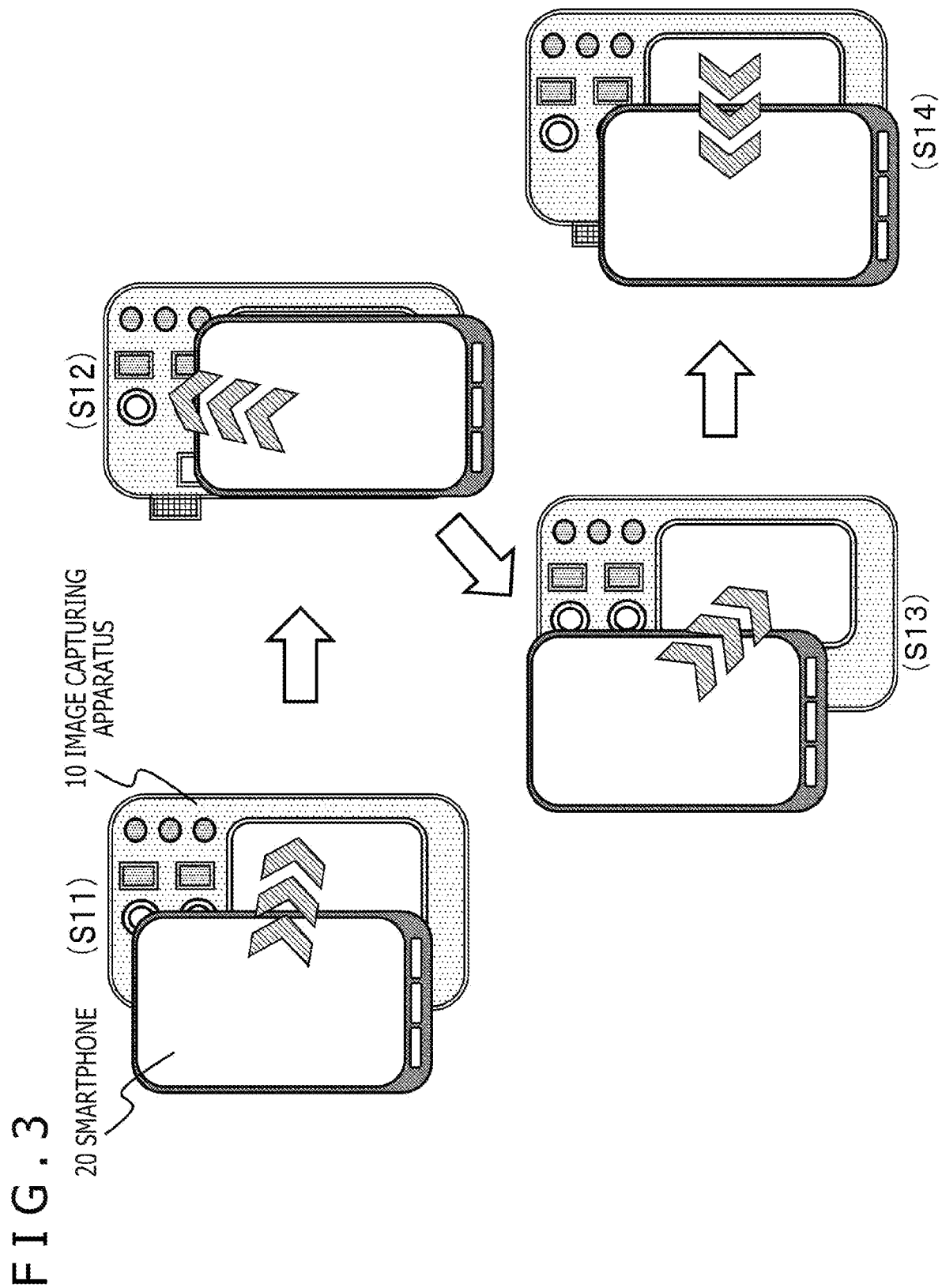
FIG. 3 is a view for describing an example of aligning proximity communication units.

With reference to the drawings, description is given in detail below regarding an information processing apparatus, an information processing method, and a program, according to the present disclosure. Note that the description is given according to the following items.

1. Regarding Example of Information Processing Apparatus according to Present Disclosure
2. Regarding Example of Processing Executed by Information Processing Apparatus according to Present Disclosure
3. Regarding Sequence of Processing Executed by Information Processing Apparatus according to Present Disclosure
4. Regarding Example of Configuration of Information Processing Apparatus according to Present Disclosure
5. Regarding Embodiment Using Application That Generates Alignment Image on Basis of Image of Short-Range Wireless Communication Counterpart Apparatus
6. Regarding Example of Hardware Configuration of Information Processing Apparatus
7. Summary of Configuration of Present Disclosure <1. Regarding Example of Information Processing Apparatus according to Present Disclosure>

First, description is given regarding an example of an information processing apparatus according to the present disclosure.

The information processing apparatus according to the present disclosure is an apparatus that performs short-range wireless communication such as NFC (Near Field Communication), for example.

FIGS. 1A, 1B, 1C, and 1D illustrate, as examples of an information processing apparatuses according to the present disclosure, an image capturing apparatus 10 and a smartphone 20.

However, these are merely some examples of the information processing apparatus according to the present disclosure, and in addition to these apparatuses, the information processing apparatus according to the present disclosure includes various apparatuses such as a tablet terminal, a PC, a game device, a communication apparatus, an image forming apparatus, and a speaker apparatus.

In the following embodiments, description is given regarding an embodiment in which the image capturing apparatus 10 and the smartphone 20 are used as a representative example.

FIGS. 1A, 1B, 1C, and 1D illustrate a front surface and a back surface of each apparatus, as an external configuration of the image capturing apparatus 10 and the smartphone 20.

The back surface of each device, the image capturing apparatus 10 and the smartphone 20, is configured with a proximity communication unit as a communication unit that includes an antenna for performing short-range wireless communication.

The proximity communication units are a proximity communication unit 11 for the image capturing apparatus 10 and a proximity communication unit 21 for the smartphone 20.

These proximity communication units are communication units that perform short-range wireless communication such as NFC (Near Field Communication), for example.

As described above, the communicable range of this NFC type or other type of proximity communication unit is less than or equal to several cm, and a device provided with a communication unit that has weak output cannot perform good communication unless in an approximately close-contact state.

The smartphone 20 has a camera function, and an image captured through a camera lens 22 on the back surface of the smartphone 20 is displayed on a display unit 23 on the front surface of the smartphone 20.

In addition to a communication unit that performs short-range wireless communication such as NFC, each of the image capturing apparatus 10 and the smartphone 20 is also provided with a communication unit that performs communication such as Wi-Fi communication or Bluetooth (registered trademark) (BT) communication, for example.

For example, in a case of transmitting an image captured by the image capturing apparatus 10 to the smartphone 20, such processing as illustrated in the sequence diagram of FIG. 2 is executed.

First, in step S01, communication is performed via the NFC type or other type of proximity communication unit provided in two apparatuses that communicate, and then, authentication processing or the transmission and reception of setting information necessary to perform Wi-Fi communication (or BT communication) thereafter, such as a password or encryption key information, for example, is performed.

Subsequently, in step S02, a Wi-Fi communication (or BT communication) session that enables the transmission and reception of a large amount of data is established between the two apparatuses.

Finally, in step S03, Wi-Fi communication (or BT communication) is used to transmit an image from the image capturing apparatus 10 to the smartphone 20.

By performing this two-step communication, it becomes possible to transmit and receive password setting information or encrypted data for a time of Wi-Fi communication (or BT communication), and it is possible to prevent data from leaking.

In order to perform the processing sequence illustrated in FIG. 2, first, it is necessary to perform the short-range wireless communication of step S01.

However, as described above, the communicable range of this NFC type or other type of proximity communication unit is less than or equal to several cm, and a device provided with a communication unit that has weak output cannot perform good communication unless in an approximately close-contact state.

As illustrated in FIGS. 1A, 1B, 1C, and 1D, there is a mark that indicates the antenna position of the proximity communication unit on a device such as the image capturing apparatus 10 or the smartphone 20. If the marks are caused to come into close contact with each other, good communication is possible, but the user cannot perform alignment while viewing the marks.

In other words, for example, the user holds the smartphone 20 as illustrated in FIG. 3, and performs processing for moving the back surface of the smartphone, where the mark indicating the antenna position for the proximity communication unit of the smartphone is present, forward, backward, leftward, or rightward so as to approach and come into close contact with the proximity communication unit 11 on the back surface of the image capturing apparatus 10.

In this state, the user cannot confirm the mark for the proximity communication unit 21 on the back surface of the smartphone 20. In addition, the position of the mark for the proximity communication unit 11 on the image capturing apparatus 10 side, which is covered by the smartphone 20, is also unclear.

As a result, it becomes more likely for a situation to occur in which the two devices are brought into close contact in a state in which there is a deviation between the positions for the antennas which are communication units for the camera and smartphone, and short-range wireless communication between the devices cannot be performed in this case.

Figure 4B:
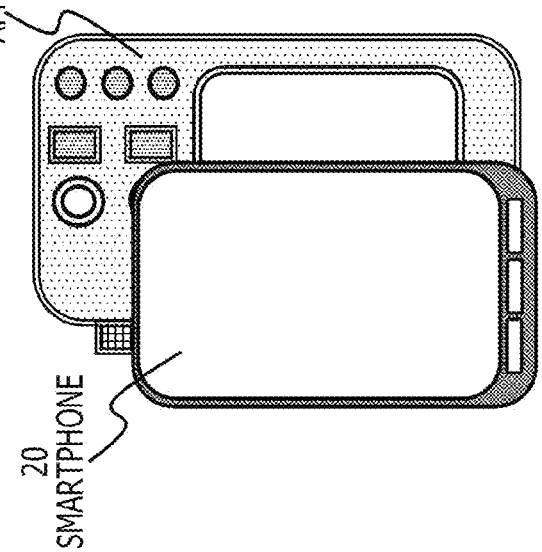
FIGS. 4A and 4B are views for describing an example of aligning proximity communication units.
Figure 4A:
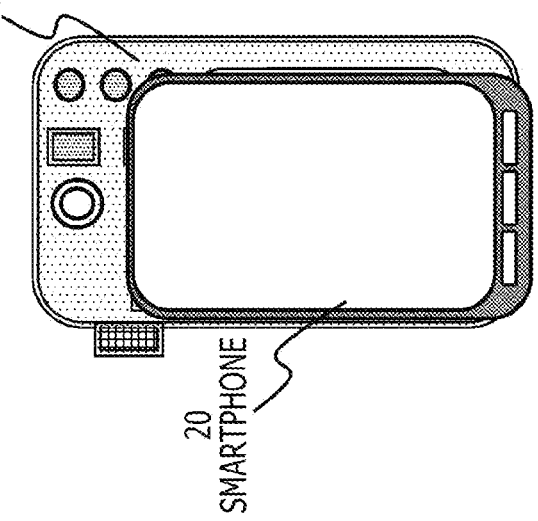

For example, in the state of FIG. 4A, there is a large position deviation between the proximity communication unit 11 of the image capturing apparatus 10 and the proximity communication unit 21 of the smartphone 20, and setting is such that communication is not possible.

In the state of FIG. 4B, there is a small position deviation between the proximity communication unit 11 of the image capturing apparatus 10 and the proximity communication unit 21 of the smartphone 20, and setting is such that communication is possible.

It is not simple to quickly move the smartphone 20 to the position indicated FIG. 4B.

<2. Regarding Example of Processing Executed by Information Processing Apparatus according to Present Disclosure>

Next, description is given regarding processing executed by the information processing apparatus according to the present disclosure.

Figure 5:
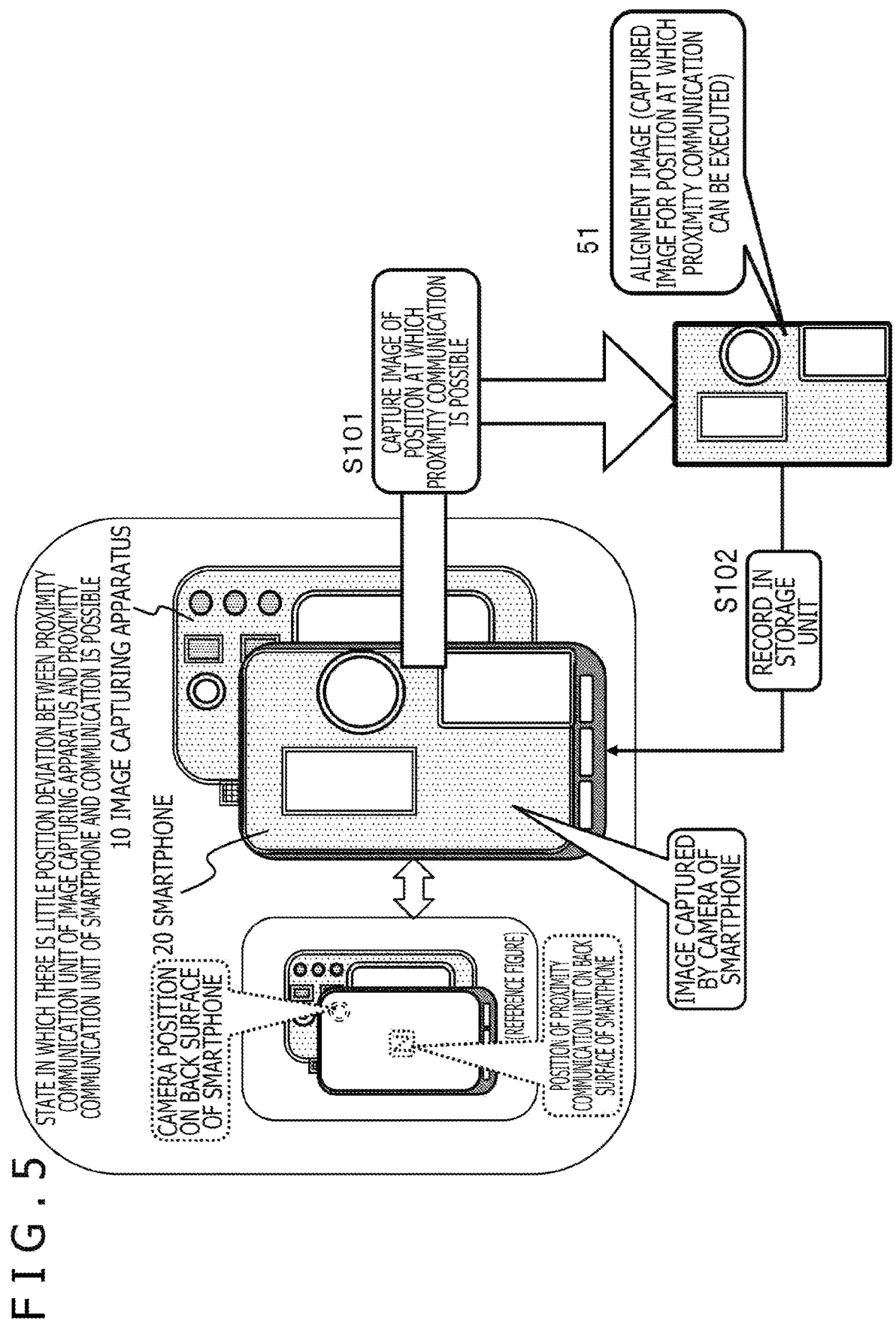
FIG. 5 is a view for describing an example of processing executed by an information processing apparatus according to the present disclosure.

FIG. 5 is a view for describing an example of processing executed by the smartphone 20, which is an information processing apparatus according to the present disclosure.

The processing illustrated in FIG. 5 is advance preparation processing for aligning proximity communication units in a short amount of time.

First, the smartphone 20 is aligned to a position at which short-range wireless communication with the image capturing apparatus 10, which is the short-range wireless communication counterpart apparatus, is possible.

In this, image capturing is performed by the camera of the smartphone 20 at the position at which short-range wireless communication is possible. As described with reference to FIGS. 1A, 1B, 1C, and 1D, the camera lens 22 of the smartphone 20 is on the back surface of the smartphone 20, similarly to the proximity communication unit 21 of the smartphone 20, and an image is captured through the camera lens 22 that is on the back surface of the smartphone 20. The image is displayed on the display unit 23 as a live view image.

The user turns the camera function of the smartphone 20 on and causes the smartphone 20 to move above the image capturing apparatus 10. At a certain region, the proximity communication unit 21 of the smartphone 20 approaches the proximity communication unit 11 of the image capturing apparatus 10. When a position at which communication is possible is reached, a notification sound (for example, "pip") is outputted, indicating that a control unit of the smartphone 20 can communicate. At this position, the user operates the shutter of the smartphone 20 to capture a still image.

This processing is the processing of step S101 illustrated in FIG. 5. In other words, an image for a position at which short-range wireless communication is possible is captured.

By this image capturing processing, an alignment image 51 illustrated in FIG. 5 is captured. The alignment image 51 is an image of the communication counterpart apparatus at a position at which short-range wireless communication can be performed.

In step S102, this alignment image 51 is stored in a storage unit (memory) of the smartphone 20.

The processing is advance preparation processing for subsequently aligning the proximity communication units in a short amount of time.

By this advance preparation processing, a state is entered in which the alignment image 51 is stored in the storage unit of the smartphone 20.

After this advance preparation processing, it is possible to use the alignment image 51 stored in this storage unit, to align the positions of the proximity communication units of the smartphone 20 and the image capturing apparatus 10 easily and with high accuracy.

With reference to FIGS. 6, 7A, 7B, 7C, 7D, 7E, 7F, 7G, and 7H, description is given regarding processing in which the alignment image 51 stored in the storage unit of the smartphone 20 is used, in other words, processing for aligning the positions of the proximity communication units of the smartphone 20 and the image capturing apparatus 10.

Figure 6:
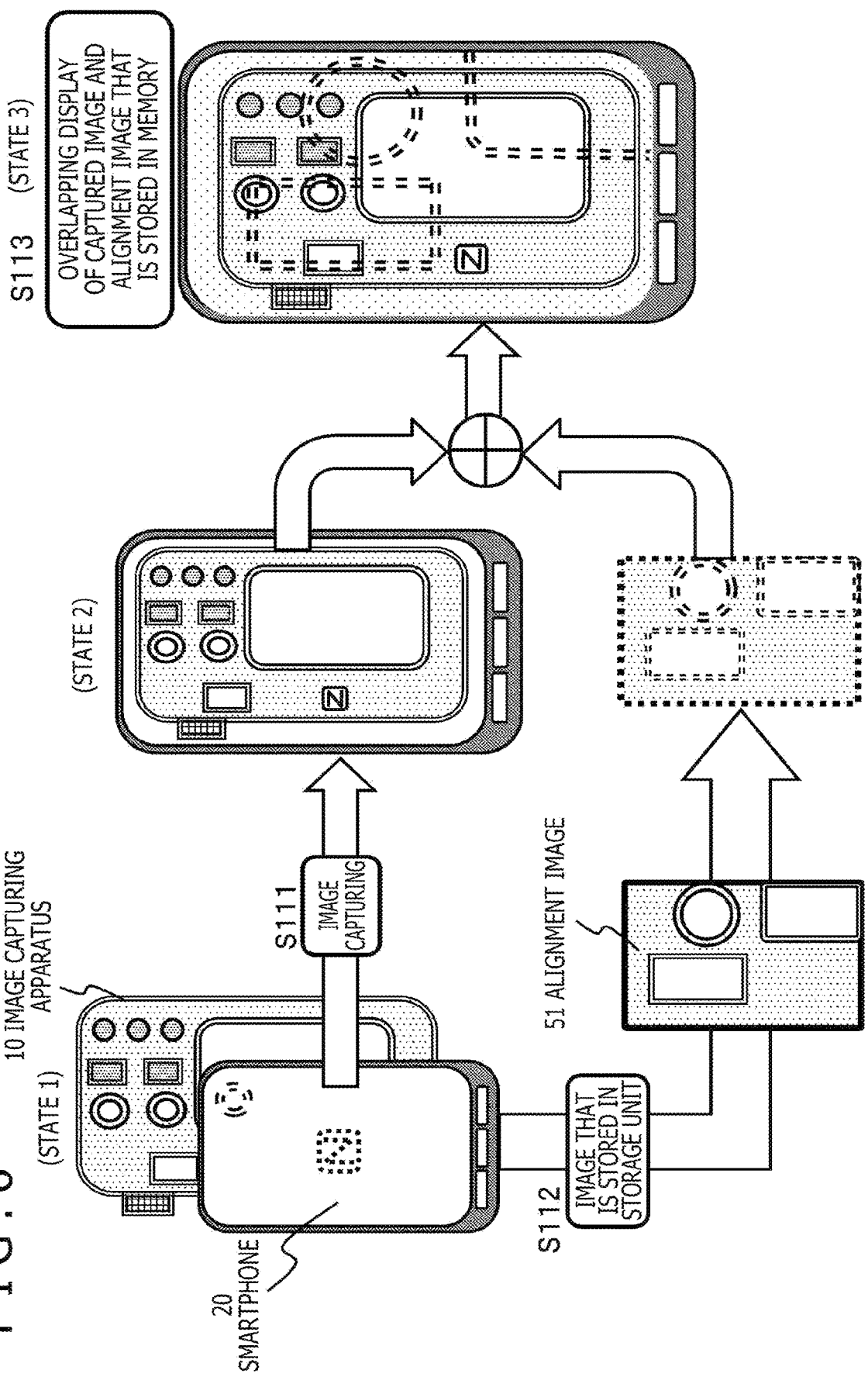
FIG. 6 is a view for describing an example of processing executed by the information processing apparatus according to the present disclosure.

First, as illustrated at the top left (state 1) in FIG. 6, in a state in which the surface of the image capturing apparatus 10 on which the proximity communication unit 11 is formed is facing the surface of the smartphone 20 on which the proximity communication unit 21 is formed, in other words, disposing the back surfaces of the apparatuses to face each other, in step S111, the camera function of the smartphone 20 is turned ON, and capturing of an image (live view image) starts.

When image capturing starts, a moving image that is the image currently being captured, in other words, a live view image, is displayed on the display unit 23 of the smartphone 20.

As illustrated by (state 2) in FIG. 6, the image currently being captured, for example, an image that is a portion of the back surface of the image capturing apparatus 10, is displayed on the display unit 23 of the smartphone 20.

Furthermore, in step S112, the alignment image 51 which has been stored in the storage unit (memory) of the smartphone 20 is read out.

Next, in step S113, both the current captured image for the smartphone 20 and the alignment image 51 read out from the storage unit are displayed on the display unit 23 of the smartphone 20.

FIG. 6 (state 3) illustrates an example of an image displayed after overlapping both the current captured image for the smartphone 20 and the alignment image 51 read out from the storage unit.

Data indicated by broken lines is the alignment image 51 generated by the processing described with reference to FIG. 5 earlier, and stored in the storage unit.

Note that the alignment image 51 may be overlappingly displayed on the current captured image (live view image), or may be displayed after being converted to display data that includes only outline data. In addition, a configuration may be taken to convert the alignment image to a format for transparent data through which background data can be seen, and overlappingly display the alignment image on the live view image.

These data conversions are executed in the control unit of the smartphone 20.

This alignment image 51 is captured by the camera of the smartphone 20 in a state in which the smartphone 20 is in a position where short-range wireless communication by the proximity communication unit 21 of the smartphone 20 and the proximity communication unit 11 of the image capturing apparatus 10 is possible.

Accordingly, if the current captured image (live view image) for the smartphone 20 is caused to move to overlap the alignment image 51 indicated by broken lines, it becomes possible to set a position at which short-range wireless communication by the proximity communication unit 21 of the smartphone 20 and the proximity communication unit 11 of the image capturing apparatus 10 is possible.

With reference to FIGS. 7A, 7B, 7C, 7D, 7E, 7F, 7G, and 7H, description is given regarding this alignment processing.

FIGS. 7A, 7B, 7C, 7D, 7E, 7F, 7G, and 7H illustrate disposition examples 1 through 4 for cases where the user moves the smartphone 20 to various positions above the image capturing apparatus 10, and, for each disposition example, illustration is given for overlapped image display examples 1 through 4 which are examples of displaying an image that is displayed on the display unit 23 of the smartphone 20, in other words, an image resulting from overlapping the current captured image and the alignment image 51.

FIG. 7A Disposition example 1 is a state in which a user who holds a smartphone is capturing the image capturing apparatus 20 from far away after disposing the smartphone 20 at a position that is separated from the image capturing apparatus 10 by a certain amount.

In this case, an image of the entirety of the image capturing apparatus 20, which is the current captured image (live view image), is displayed on the display unit 23 of the smartphone 20, at a central position of the display unit 23, as illustrated in FIG. 7B.

This current captured image (live view image) in no way matches the alignment image 51 which is indicated by broken lines in the display unit 23.

FIG. 7C Disposition example 2 is a state in which the user has brought the smartphone 20 somewhat closer to the image capturing apparatus 10, and is capturing the image capturing apparatus 20.

In this case, an image of the image capturing apparatus 20, which is the current captured image (live view image), is displayed over the entirety of the display unit 23 of the smartphone 20, as illustrated in FIG. 7D.

However, this current captured image (live view image) also in no way matches the alignment image 51 which is indicated by broken lines in the display unit 23.

FIG. 7E Disposition example 3 is a state in which the user has brought the smartphone 20 even closer to the image capturing apparatus 10, and is capturing the image capturing apparatus 20.

In this case, an image of a partial region of the image capturing apparatus 20, which is the current captured image (live view image), is displayed over the entirety of the display unit 23 of the smartphone 20, as illustrated in FIG. 7F.

However, this current captured image (live view image) also does not match the alignment image 51 which is indicated by broken lines in the display unit 23.

FIG. 7G Disposition example 4 is a state of a result of the user moving the smartphone 20 while viewing the alignment image 51 displayed on the display unit 23 and making a setting such that the current captured image (live view image) matches the alignment image 51.

In other words, the current captured image (live view image) matches the alignment image 51, as illustrated by FIG. 7H.

This state is a state in which the proximity communication units of the smartphone 20 and the image capturing apparatus 10 are set to positions at which communication is possible, and it becomes possible to perform communication through the proximity communication units of the smartphone 20 and the image capturing apparatus 10 in this disposition state.

In this manner, in processing of the present disclosure, the camera of one apparatus (the smartphone 20) captures an image of a state in which there is setting to a position where communication according to the proximity communication units of the smartphone 20 and the image capturing apparatus 10 is possible, and this image is used as an alignment image in order to align the two proximity communication units.

By overlappingly displaying the captured image currently being captured by the camera of one apparatus (live view image) and the alignment image on a display unit and causing the one apparatus (smartphone 20) to move such that the current captured image matches the alignment image, it is possible to easily and reliably align the two apparatuses to a position at which short-range wireless communication is possible.

Note that the storage unit of the smartphone 20, together with the alignment image 50, may also store, as image attribute information, information such as image scale information, photographic subject distance information, or focal length information obtained at a time of capturing the alignment image 50.

When performing alignment, if image capturing processing of the live view image is performed under conditions that match conditions obtained at the time of capturing the alignment image 50, alignment with even higher accuracy becomes possible.

Note that, in the example of processing described with reference to FIGS. 5 through 8, the alignment image stored in the storage unit of the smartphone 50 is given as the entirety of an image captured by the smartphone 20, but there may be a configuration in which only a portion of a captured image is cut out, and this partial image that has been cut out is stored in the storage unit as an alignment image.

With reference to FIG. 8, description is given regarding a specific example.

FIG. 8 is advance preparation processing for aligning proximity communication units in a short amount of time, similarly to FIG. 5 which is described earlier. First, the smartphone 20 is aligned to a position at which short-range wireless communication with the image capturing apparatus 10, which is the short-range wireless communication counterpart apparatus, is possible.

The user turns the camera function of the smartphone 20 on and causes the smartphone 20 to move above the image capturing apparatus 10. At a certain location, the proximity communication unit 21 of the smartphone 20 approaches the proximity communication unit 11 of the image capturing apparatus 10. When a position at which communication is possible is reached, a notification sound (for example, "pip") is outputted, indicating that the control unit of the smartphone 20 can communicate. At this position, the user operates the shutter of the smartphone 20 to capture a still image.

This processing is the processing of step S121 illustrated in FIG. 8. In other words, an image in a position at which short-range wireless communication is possible is captured.

By this image capturing processing, a captured image 71 illustrated in FIG. 8 is captured. The captured image 71 is an image of the communication counterpart apparatus at a position at which short-range wireless communication can be performed.

Furthermore, in step S122, a portion of the captured image 71 is cut out, and this cutout image is set as an alignment image 72.

In step S123, this alignment image 72 is stored in the storage unit (memory) of the smartphone 20.

Note that, when storing this alignment image 72 in the storage unit (memory) of the smartphone 20, information indicating the cutout position may also be stored, as attribute information, in the storage unit together with the alignment image 72. Note that cutout position information is used when determining a display position for the alignment image 72 with respect to the display unit 23. In other words, the cutout position information is information that can be used as display position information for the alignment image 72.

The processing is the advance preparation processing for subsequently aligning the proximity communication units in a short amount of time.

By this advance preparation processing, a state is entered in which the alignment image 72 is stored in the storage unit of the smartphone 20.

The alignment image 72 is an image that includes a partial region of the captured image 71, which is an image of the communication counterpart apparatus at a position at which short-range wireless communication can be performed.

In this manner, by making an image stored in the storage unit of the smartphone 20 be a cutout image of a partial region and not the entirety of a captured image, it is possible to reduce the amount of content recorded to the storage unit.

After this advance preparation processing, it is possible to use the alignment image 72 stored in this storage unit to easily align the positions of the proximity communication units of the smartphone 20 and the image capturing apparatus 10.

With reference to FIGS. 9, 10A, 10B, 10C, 10D, 10E, 10F, 10G, and 10H, description is given regarding processing in which the alignment image 72 which is a partial cutout image stored in the storage unit of the smartphone 20 is used, in other words, processing for aligning the positions of the proximity communication units of the smartphone 20 and the image capturing apparatus 10.

First, as illustrated at the top left (state 1) in FIG. 9, in a state in which the surface of the image capturing apparatus 10 on which the proximity communication unit 11 is formed is facing the surface of the smartphone 20 on which the proximity communication unit 21 is formed, in other words, disposing the back surfaces of the apparatuses to face each other, in step S131, the camera function of the smartphone 20 is turned ON, and capturing of an image starts.

When image capturing starts, a moving image that is the image currently being captured, in other words, a live view image, is displayed on the display unit 23 of the smartphone 20.

As illustrated in FIG. 9 (state 2), the image currently being captured, for example, an image that is a portion of the back surface of the image capturing apparatus 10, is displayed on the display unit 23 of the smartphone 20.

Furthermore, in step S132, the alignment image 72 which is stored in the storage unit (memory) of the smartphone 20 is read out. This alignment image 72 is an image resulting from cutting out a portion of the captured image 71 which has been captured according to processing described earlier with reference to FIG. 8, in other words, a captured image that has been captured at a position where short-range wireless communication between the smartphone 20 and the image capturing apparatus 10 is possible.

Next, in step S133, both the current captured image for the smartphone 20 and the alignment image 72 read out from the storage unit are displayed on the display unit 23 of the smartphone 20.

FIG. 9 (state 3) illustrates an example of an image displayed after overlapping both the current captured image for the smartphone 20 and the alignment image 72 read out from the storage unit.

Data indicated by broken lines is the alignment image 72 generated by the processing described with reference to FIG. 8 earlier, and stored in the storage unit.

Note that the display position for this alignment image 72 is determined on the basis of the cutout position information stored in the storage unit together with the alignment image 72.

Note that the alignment image 72 may be overlappingly displayed on the current captured image (live view image), or may be displayed after being converted to display data that includes only outline data. In addition, a configuration may be taken to convert the alignment image to a format for transparent data through which background data can be seen, and overlappingly display the alignment image on the live view image.

These data conversions are executed in the control unit of the smartphone 20.

The alignment image 72 displayed on the display unit 23 is a portion of an image captured by the camera of the smartphone 20 in a state in which the smartphone 20 is in a position where short-range wireless communication by the proximity communication unit 21 of the smartphone 20 and the proximity communication unit 11 of the image capturing apparatus 10 is possible.

Accordingly, if the current captured image for the smartphone 20 is caused to move to overlap the alignment image 72 indicated by broken lines, it becomes possible to set a position at which short-range wireless communication by the proximity communication unit 21 of the smartphone 20 and the proximity communication unit 11 of the image capturing apparatus 10 is possible.

With reference to FIGS. 10A, 10B, 10C, 10D, 10E, 10F, 10G, and 10H, description is given regarding this alignment processing.

FIGS. 10A, 10B, 10C, 10D, 10E, 10F, 10G, and 10H illustrate disposition examples 1 through 4 for cases where the user moves the smartphone 20 to various positions above the image capturing apparatus 10, and, for each disposition example, illustration is given for overlapped image display examples 1 through 4 which are examples of displaying an image that is displayed on the display unit 23 of the smartphone 20, in other words, an image resulting from overlapping the current captured image and the alignment image 72.

FIG. 10A Disposition example 1 is a state in which a user who holds a smartphone is capturing the image capturing apparatus 20 from far away after disposing the smartphone 20 at a position that is separated from the image capturing apparatus 10 by a certain amount.

In this case, an image of the entirety of the image capturing apparatus 20, which is the current captured image (live view image), is displayed on the display unit 23 of the smartphone 20, at a central position of the display unit 23 as illustrated in FIG. 10B.

This current captured image (live view image) in no way matches the alignment image 72 which is indicated by broken lines in the display unit 23.

FIG. 10C Disposition example 2 is a state in which the user has brought the smartphone 20 somewhat closer to the image capturing apparatus 10, and is capturing the image capturing apparatus 20.

In this case, an image of the image capturing apparatus 20, which is the current captured image (live view image), is displayed over the entirety of the display unit 23 of the smartphone 20, as illustrated in FIG. 10D.

However, this current captured image (live view image) also in no way matches the alignment image 72 which is indicated by broken lines in the display unit 23.

FIG. 10E Disposition example 3 is a state in which the user has brought the smartphone 20 even closer to the image capturing apparatus 10, and is capturing the image capturing apparatus 20.

In this case, an image of a partial region of the image capturing apparatus 20, which is the current captured image (live view image), is displayed over the entirety of the display unit 23 of the smartphone 20, as illustrated in FIG. 10F.

However, this current captured image (live view image) also does not match the alignment image 72 which is indicated by broken lines in the display unit 23.

FIG. 10G Disposition example 4 is a state of a result of the user moving the smartphone 20 while viewing the alignment image 72 displayed on the display unit 23 and making a setting such that the current captured image (live view image) matches the alignment image 72.

In other words, the current captured image (live view image) matches the alignment image 72, as illustrate by FIG. 10H.

This state is a state in which the proximity communication units of the smartphone 20 and the image capturing apparatus 10 are set to positions at which communication is possible, and it becomes possible to perform communication through the proximity communication units of the smartphone 20 and the image capturing apparatus 10 in this disposition state.

The example illustrated in FIGS. 8 through 10 uses an image that is a partial region of an image captured by the smartphone 20 as the alignment image 72.

By performing processing such as this, it is possible to reduce capacity of the storage unit that is used, and it is also possible to reduce the processing load for each piece of processing, such as image display processing.

<3. Regarding Sequence of Processing Executed by Information Processing Apparatus according to Present Disclosure>

Next, description is given regarding a sequence of processing executed by the information processing apparatus according to the present disclosure.

First, with reference to the flow chart illustrated in FIG. 11, description is given regarding a processing sequence for pre-processing, in other words, a sequence for pre-processing that performs processing for generating and storing to memory the alignment image, described earlier with reference to FIG. 5 or FIG. 8.

Note that processing in accordance with the flow illustrated in FIG. 11 and earlier drawings is processing that can be executed under the control of a CPU or the like which has functionality of executing a program, in accordance with a program stored in a storage unit of an information processing apparatus such as a smartphone, for example.

Description is sequentially given regarding processing of each step of the flow illustrated in FIG. 11.

(Step S201)

First, in step S201, a position at which short-range wireless communication is possible between an information processing apparatus with a camera and a short-range wireless communication counterpart apparatus is detected.

This processing is, for example, executed by a user who holds a smartphone which is an information processing apparatus with a camera in his/her hand and moves the smartphone above the short-range wireless communication counterpart apparatus, which is an image capturing apparatus, for example.

For example, a proximity communication unit of the smartphone (information processing apparatus with a camera) continuously outputs a predetermined signal.

A control unit of the smartphone detects whether or not there is a response from a proximity communication unit of the image capturing apparatus (short-range wireless communication counterpart apparatus) during a time period in which this signal is being outputted.

In a case in which a response is detected, the control unit of the smartphone determines that setting has been made to a position at which short-range wireless communication is possible between the smartphone (information processing apparatus with a camera) and the image capturing apparatus (short-range wireless communication counterpart apparatus).

Note that the control unit of the smartphone performs, for example, output of a notification sound in response to processing for determining that setting has been made to a position at which short-range wireless communication is possible between the two apparatuses.

(Step S202)

When a position at which short-range wireless communication is possible between the information processing apparatus with a camera and the short-range wireless communication counterpart apparatus is detected in step S201, in step S202, the information processing apparatus with a camera uses the camera of the information processing apparatus with a camera to capture an image of the short-range wireless communication counterpart apparatus at this position at which short-range wireless communication is possible.

(Step S203)

Next, in step S203, the image captured in step S202 or a cutout image of a portion thereof is set as an alignment image, and stored in the storage unit of the information processing apparatus with a camera.

Note that, in a case where the alignment image stored in the storage unit is a partial cutout image, data indicating the cutout position is also stored.

Furthermore, information such as image scale information, photographic subject distance information, or focal length information obtained at the time of capturing the alignment image may be stored together as image attribute information.

The processing in accordance with the flow illustrated in FIG. 11 is advance preparation processing for aligning proximity communication units in a short amount of time.

Next, with reference to the flow chart illustrated in FIG. 12, description is given regarding a sequence for processing for aligning proximity communication units executed by an information processing apparatus that has stored an alignment image in a storage unit according to this advance preparation processing.

Description is sequentially given regarding processing of each step of the flow illustrated in FIG. 12.

(Step S221)

First, in step S221, a camera of the information processing apparatus with a camera is activated. Specifically, the information processing apparatus with a camera is a smartphone, for example, and activates a camera of the smartphone.

(Step S222)

Next, in step S222, the camera of the information processing apparatus with a camera is used to capture an image of a short-range wireless communication counterpart apparatus, and the captured image is displayed on a display unit.

For example, capturing of a live view image of the image capturing apparatus (short-range wireless communication counterpart apparatus) is started by use of the camera of the smartphone, and the display unit of the smartphone is caused to display the live view image.

(Step S223)

Next, the alignment image stored in the storage unit of the smartphone (information processing apparatus with a camera) is read out, outputted to the display unit, and overlappingly displayed with the live view image which is currently being captured.

For example, display of the overlapped images illustrated by (state 3) in FIG. 6 or (state 3) in FIG. 9 is performed.

(Step S224)

Step S224 is processing for movement of the smartphone (information processing apparatus with a camera) by the user.

The user moves the information processing apparatus with a camera such that the captured image and the alignment image overlap.

(Step S225)

In step S225, the control unit of the smartphone (information processing apparatus with a camera) determines whether or not setting has been made to a position at which short-range wireless communication is possible between the smartphone (information processing apparatus with a camera) and the image capturing apparatus (short-range wireless communication counterpart apparatus).

The proximity communication unit of the smartphone (information processing apparatus with a camera) continuously outputs a predetermined signal, and the control unit of the smartphone detects whether or not there is a response from the proximity communication unit of the image capturing apparatus (short-range wireless communication counterpart apparatus) during a time period in which this signal is being outputted.

In a case in which a response is detected, the control unit of the smartphone determines that setting has been made to a position at which short-range wireless communication is possible between the smartphone (information processing apparatus with a camera) and the image capturing apparatus (short-range wireless communication counterpart apparatus).

The processing of steps S224 and S225 is repeated until it is determined in step S225 that setting has been made to a position at which short-range wireless communication is possible between the two apparatuses.

When it is determined in step S225 that setting has been made to a position at which short-range wireless communication is possible between the two apparatuses, the processing proceeds to step S226.

(Step S226)

In a case in which the control unit of the smartphone determines in step S225 that setting has been made to a position at which short-range wireless communication is possible between the smartphone (information processing apparatus with a camera) and the image capturing apparatus (short-range wireless communication counterpart apparatus), the processing proceeds to step S226.

In step S226, the control unit of the smartphone (information processing apparatus with a camera) executes notification processing for notifying a user that setting has been made to a position at which short-range wireless communication is possible between the two apparatuses. This notification processing is, for example, output of a notification sound, processing for displaying with respect to the display unit while communication is being performed, or the like.

<4. Regarding Example of Configuration of Information Processing Apparatus according to Present Disclosure>

Next, description is given regarding an example of a configuration of an information processing apparatus according to the present disclosure.

Figure 13:
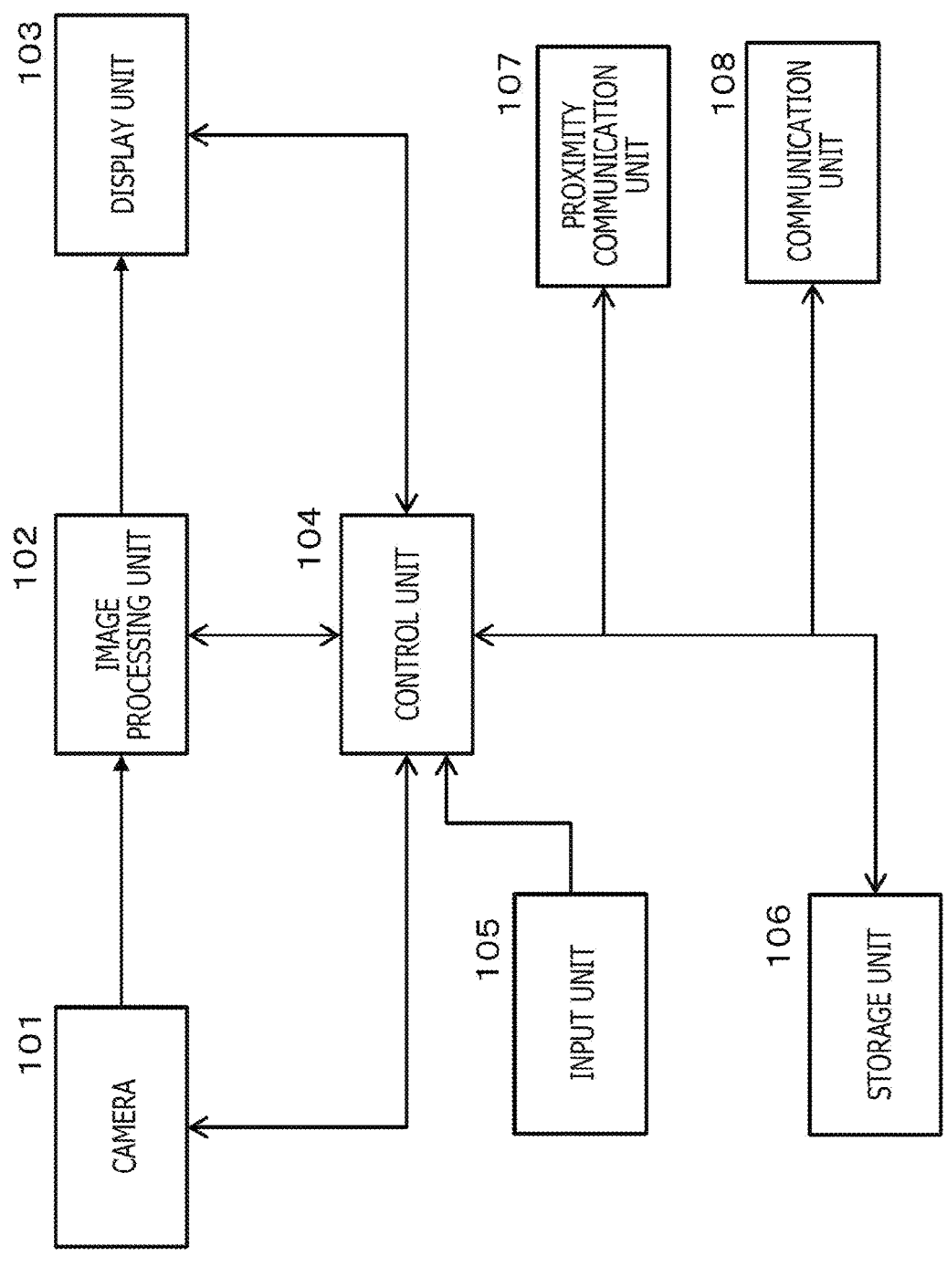
FIG. 13 is a view for describing an example of a configuration of the information processing apparatus according to the present disclosure.

FIG. 13 is a view that illustrates an example of a configuration of a smartphone which is an example of an information processing apparatus according to the present disclosure.

As illustrated in FIG. 13, an information processing apparatus 100 has a camera 101, an image processing unit 102, a display unit 103, a control unit 104, an input unit 105, a storage unit 106, a proximity communication unit 107, and a communication unit 108.

The camera 101 performs image capturing. An image captured by the camera 101 is subject to predetermined image processing in the image processing unit 102, and then displayed on the display unit 103. In addition, the captured image is recorded to the storage unit 106 according to a user operation (image capturing processing) via the input unit 105.

Capturing of an alignment image described earlier with reference to the flow in FIG. 5, FIG. 8, and FIG. 11 and an alignment image captured at a time of processing for storing to the storage unit are stored in the storage unit 106.

The image processing unit 102 executes image processing with respect to an image captured in the camera 101, for example, gamma correction, white balance adjustment, compression processing on image data to be stored in the storage unit 106, decompression processing when displaying an image that has been stored in the storage unit 106 on the display unit 103, and the like.

The display unit 103 performs display processing for an image captured by the camera 101 or an image stored in the storage unit 106.

For example, when executing processing for aligning proximity communication units described earlier with reference to FIGS. 6, 7A, 7B, 7C, 7D, 7E, 7F, 7G 7H, 9, 10A, 10B, 10C, 10D, 10E, 10F, 10G, and 10H, and the flow of FIG. 12, display of an image resulting from overlapping an image captured by the camera 101 (a live view image) and an alignment image stored in the storage unit 106 is performed.

The control unit 104 executes control of processing that is executed in the information processing apparatus 100. For example, the control unit 104 executes processing according to a program stored in the storage unit 106.

There is a configuration in which the control unit 104 is provided with a processor such as a CPU that has functionality for executing programs.

The input unit 105 is an operation unit that is operated by a user, and includes a shutter operation unit to be used when capturing an image or an input unit for various items of information, such as the input of additional settings.

The storage unit 106 stores an image captured by the camera 101, a program that is executed by the control unit 104, parameters for various kinds of processing, or the like.

The proximity communication unit 107 is a communication unit that performs short-range wireless communication such as NFC, for example.

The communication unit 108 is a communication unit that performs communication through, for example, Wi-Fi communication, Bluetooth (registered trademark) (BT) communication, or the like.

<5. Regarding Embodiment Using Application That Generates Alignment Image on Basis of Image of Short-Range Wireless Communication Counterpart Apparatus>

Next, description is given regarding an embodiment that uses an application that generates an alignment image on the basis of an image of a short-range wireless communication counterpart apparatus.

In the embodiment described earlier, in processing for capturing an alignment image and storing the alignment image in a storage unit, in other words, in pre-processing, as described with reference to FIGS. 5, 8, and 11, the user detects a position at which short-range wireless communication is possible with a short-range wireless communication counterpart apparatus, for example, an image capturing apparatus, and performs processing to capture an image at that position to thereby generate the alignment image.

Such an alignment image can also be automatically generated after, for example, obtaining an image of the entirety of a short-range wireless communication counterpart apparatus, for example, an image capturing apparatus, and then detecting a proximity communication unit that is discriminated from this image of the entirety of the short-range wireless communication counterpart apparatus.

Below, description is given regarding an embodiment that uses an application that generates an alignment image on the basis of an image of a short-range wireless communication counterpart apparatus.

Figure 14:
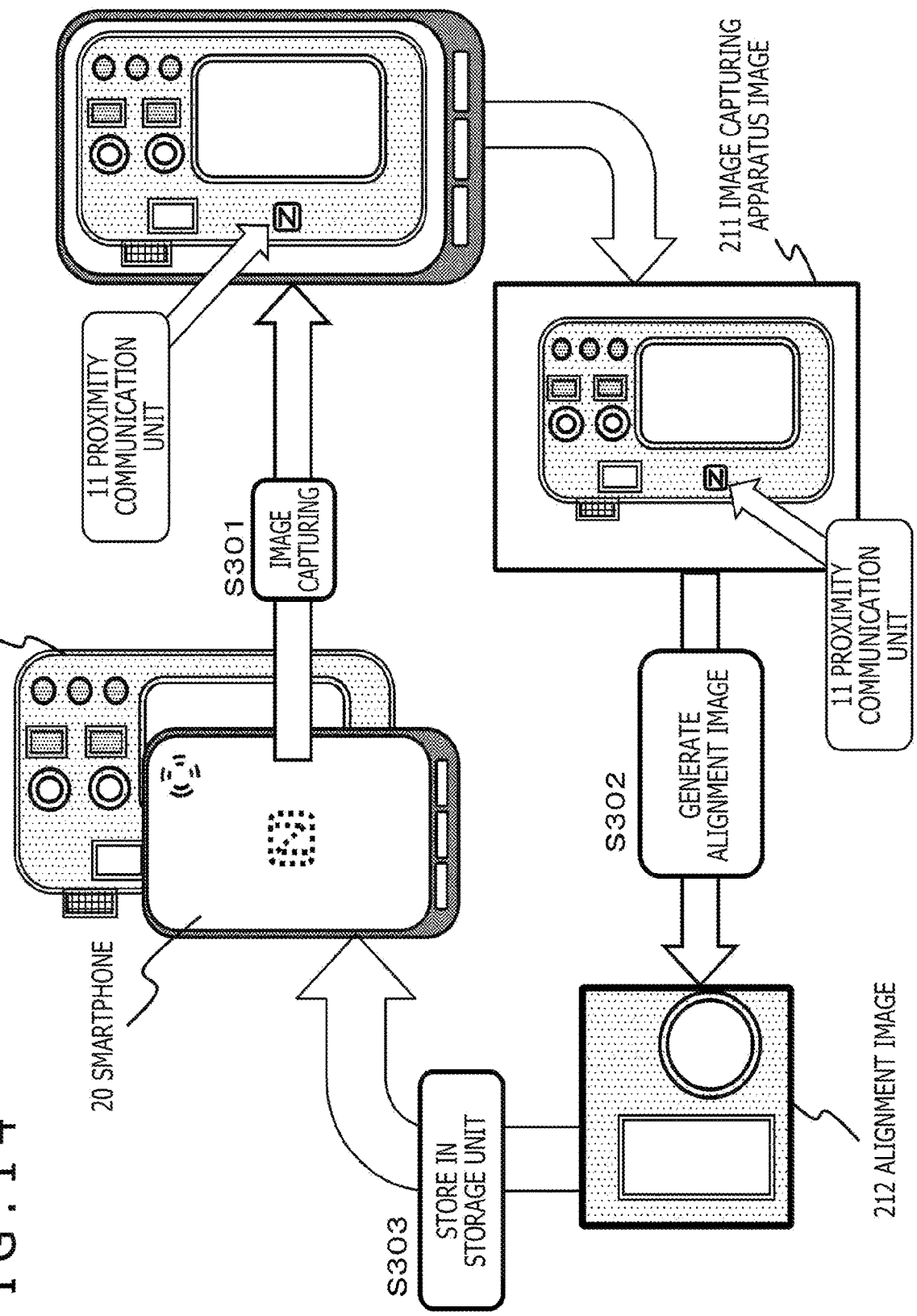
FIG. 14 is a view for describing an example of processing executed by the information processing apparatus according to the present disclosure.
Figure 15:
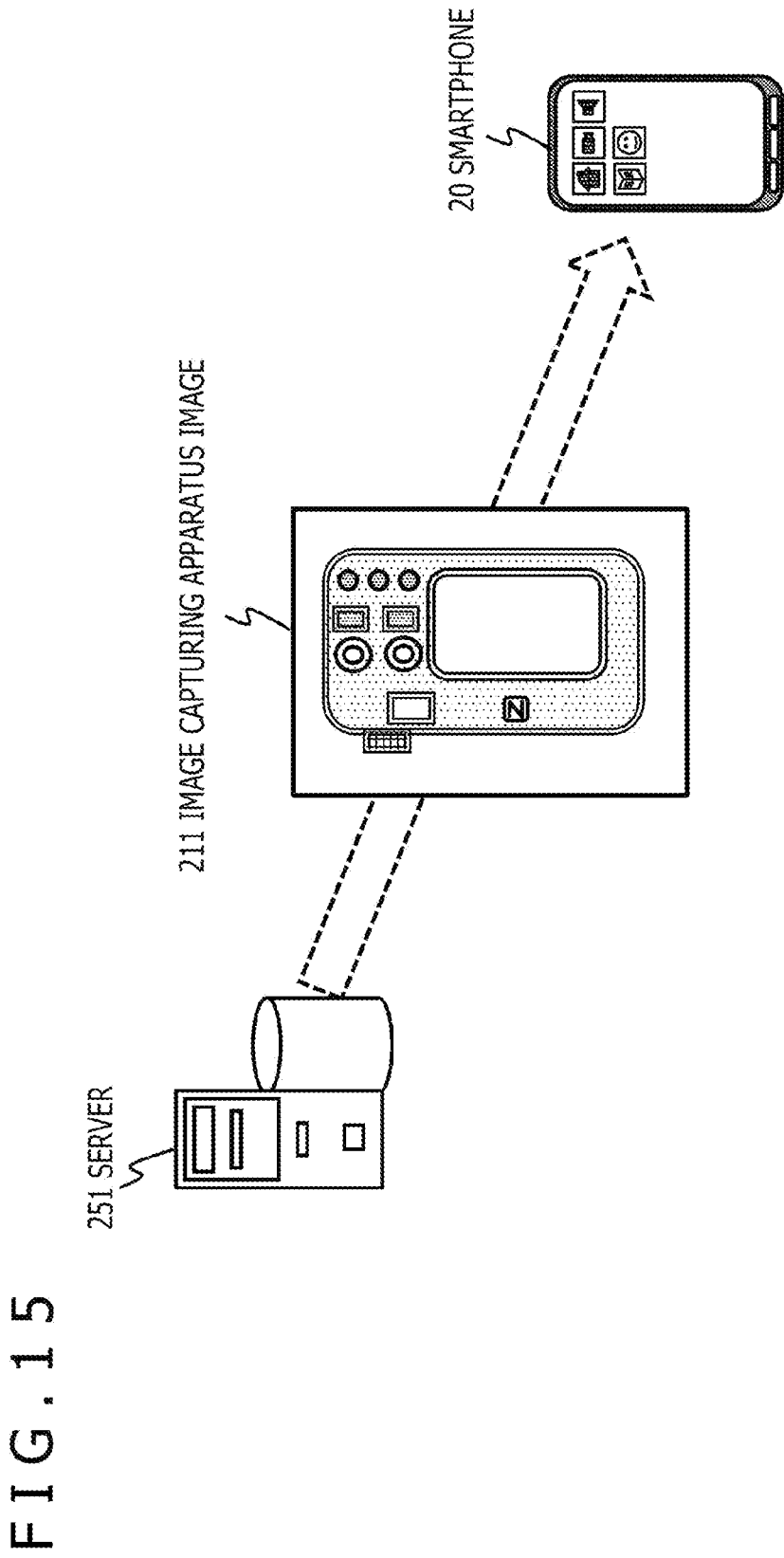
FIG. 15 is a view for describing an example of processing executed by the information processing apparatus according to the present disclosure.

FIG. 14 is a view for describing processing for generating an alignment image according to this application. The application is stored in the smartphone 20.

The application of the smartphone 20 executes processing for steps S301 through S303 illustrated in FIG. 14, or processing for steps S302 and S303.

The processing of step S301 is processing for capturing an image of a short-range wireless communication counterpart apparatus, which is the image capturing apparatus 10 here. It is necessary for the captured image to include an image that indicates the position of the proximity communication unit 11 of the image capturing apparatus 10. In the example in the view, a mark (N) corresponds to an image that indicates the position of the proximity communication unit 11.

In step S301, the image capturing apparatus 10 is captured, and an image capturing apparatus image 211 is obtained.

Note that image capturing processing may be executed as processing by the application, or may be performed by a user. In a case of being performed by the user, the captured image is provided to the application, and subsequent processing (step S302 and thereafter) is executed by the application.

Next, the application executes processing for step S302, using this image capturing apparatus image 211.

In step S302, the application uses the image capturing apparatus image 211 to generate an alignment image 212.

The application identifies the position of the proximity communication unit by analyzing the image capturing apparatus image 211 of the image capturing apparatus 10, which is a short-range wireless communication counterpart apparatus. The position of the (N) mark which indicates the position of the proximity communication unit 11 in the view is identified.

Furthermore, the application obtains the position of the proximity communication unit and the camera position of the self-apparatus, in other words, the smartphone 20, from hardware configuration information stored in the memory inside the smartphone 20.

Furthermore, on the basis of the position of the proximity communication unit of the image capturing apparatus 10 and position of the proximity communication unit and the camera position of the smartphone 20, the application estimates and generates an image captured by the camera in a case where setting is made to a position at which the self-apparatus (smartphone) and the short-range wireless communication counterpart apparatus (image capturing apparatus) are capable of short-range wireless communication via the proximity communication units on both sides, in other words, estimates and generates an alignment image 212 which is illustrated in the view.

This alignment image 212 is generated by cutout processing on the image capturing apparatus image 211.

If it is possible to obtain the position of the proximity communication unit of the image capturing apparatus 10 and the position of the proximity communication unit and the camera position of the smartphone 20, it is possible to analyze an image capturing range according to the camera of the smartphone 20 for a case where the position of the proximity communication unit of the image capturing apparatus 10 approximately matches the position of the proximity communication unit of the smartphone 20. An image of this image capturing range or a partial cutout image thereof is generated as the alignment image 212.

Note that, in a case of generating a partial cutout image as the alignment image 212, cutout position data is also set as attribute data of the image.

In step S303, the application stores the data generated in step S302, in other words, the alignment image 212, in the storage unit of the smartphone 20.

Note that, in a case of generating a partial cutout image as the alignment image 212, cutout position data is also set as attribute data of the image.

By this series of processing, the alignment image 212 is stored in the storage unit of the smartphone 20. Subsequently, by using this alignment image, it is possible to align the proximity communication units easily and with high accuracy.

This alignment processing is similar to the flow described earlier with reference to FIG. 12.

Note that, although an image of the entirety of the image capturing apparatus 10, in other words, the image capturing apparatus image 211, can also be obtained in step S301 according to image capturing processing by the application or image capturing processing by the user, an image of the entirety of the image capturing apparatus 10 that is obtained from an external site such as a server 251 of a manufacturer as illustrated in FIG. 14, for example, may be used.

Next, with reference to the flow chart illustrated in FIG. 16, description is given regarding a processing sequence for this embodiment, in other words, a sequence of processing for generating and recording an alignment image according to the application.

Description is sequentially given regarding processing of each step of the flow chart illustrated in FIG. 16.

(Step S321)

First, in step S321, the application obtains image data that enables the confirmation of the position of the proximity communication unit of the short-range wireless communication counterpart apparatus.

This corresponds to the processing of step S301 described with reference to FIG. 14, and is processing for capturing the image capturing apparatus image 211 in the example illustrated in FIG. 14.

Note that the image obtainment processing of step S321 may be performed by a user. In addition, obtainment may be performed from an external server.

(Step S322)

Next, in step S322, the application obtains the position of the proximity communication unit and the camera position of the self-apparatus, for example, the smartphone 20, from hardware configuration information stored in the memory inside the self-apparatus.

(Step S323)

Next, in step S323, on the basis of the position of the proximity communication unit of the short-range wireless communication counterpart apparatus and position of the proximity communication unit and the camera position of the self-apparatus, the application generates an image captured by the camera in a case where setting is made to a position at which the self-apparatus (smartphone) and the short-range wireless communication counterpart apparatus (image capturing apparatus) are capable of short-range wireless communication via the proximity communication units on both sides.

For example, the alignment image 212 illustrated in FIG. 14 is generated.

This alignment image 212 is generated by cutout processing on the image capturing apparatus image 211.

As described above, if it is possible to obtain the position of the proximity communication unit of the short-range wireless communication counterpart apparatus (image capturing apparatus) and the position of the proximity communication unit and the camera position of the self-apparatus (smartphone), it is possible to analyze an image capturing range according to the camera of the self-apparatus (smartphone) for a case where the positions of the proximity communication units of the two apparatuses approximately match. An image of this image capturing range or a partial cutout image thereof is generated as the alignment image.

Note that, in a case of generating a partial cutout image as the alignment image, cutout position data is also set as attribute data of the image.

(Step S324)

In step S324, the application stores the data generated in step S323, in other words, an alignment image, in the storage unit of the self-apparatus.

Note that, in a case of generating a partial cutout image as the alignment image, cutout position data is also set as attribute data of the image.

By this series of processing, the alignment image is stored in the storage unit of the self-apparatus, which is, for example, the smartphone 20. Subsequently, by using this alignment image, it is possible to align the proximity communication units easily and with high accuracy.

<6. Regarding Example of Hardware Configuration of Information Processing Apparatus>

With reference to FIG. 13, description has been given earlier regarding an example of a configuration of the information processing apparatus 100 envisioning a smartphone, but the information processing apparatus according to the present disclosure is not limited to a smartphone and includes various apparatuses such as a PC or a tablet terminal.

Next, with reference to FIG. 17, description is given regarding an example of a hardware configuration of an information processing apparatus according to the present disclosure. The hardware illustrated in FIG. 17 is an example of a configuration of specific hardware for an information processing apparatus according to the present disclosure.

A CPU (Central Processing Unit) 301 functions as a control unit or a data processing unit that executes various kinds of processing according to a program stored in a ROM (Read Only Memory) 302 or a storage unit 308. For example, the CPU 301 executes processing according to a sequence described in an embodiment described above. A RAM (Random Access Memory) 303 stores a program that is executed by the CPU 301, data, or the like. The CPU 301, the ROM 302, and the RAM 303 are mutually connected by a bus 304.

The CPU 301 is connected to an input/output interface 305 via the bus 304, and an input unit 306 that includes a camera, various types of switches, a keyboard, a mouse, a microphone, a sensor, or the like and an output unit 307 that includes a display, a speaker, or the like are connected to the input/output interface 305.

The CPU 301 executes various kinds of processing corresponding to a command inputted from the input unit 306, and outputs processing results to the output unit 307, for example.

The storage unit 308, which is connected to the input/output interface 305, includes a hard disk or the like, for example, and stores a program that the CPU 301 executes or various items of data. The communication unit 309 is configured by an NFC type or other type of proximity communication unit, or a communication unit for Wi-Fi communication, Bluetooth (registered trademark) (BT) communication, or alternatively data communication via a network such as the Internet or a local area network, and communicates with external apparatuses.

A drive 310, which is connected to the input/output interface 305, drives removable media 311 such as a magnetic disk, an optical disk, a magneto-optical disk, or a semiconductor memory such as a memory card, and executes recording or reading out of data.

<7. Summary of Configuration of Present Disclosure>

With references to specific embodiments, detailed description has been given above regarding embodiments of the present disclosure. However, it is obvious that a person skilled in the art could modify embodiments or make substitutions therefor, without departing from the scope of the present disclosure. In other words, the embodiments disclose the present invention in the mode of examples, and should not be interpreted as limiting. The claims should be referred to in order to determine the scope of the present disclosure.

Note that a technique disclosed in the present specification can be configured as follows.

(1) An information processing apparatus including:

a control unit that displays on a display unit an image to be presented to a user at a time of aligning a position of a communication unit of the self-apparatus that performs short-range wireless communication with a position of a communication unit of a communication counterpart apparatus, in which the control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the self-apparatus.

(2) The information processing apparatus according to (1), in which the control unit overlappingly displays, on the display unit, outline data for the alignment image on the live view image.

(3) The information processing apparatus according to (1), in which the control unit overlappingly displays, on the display unit, transparent data for the alignment image on the live view image.

(4) The information processing apparatus according to any one of (1) through (3), in which the control unit executes processing that stores, in a storage unit, the alignment image captured by the camera of the self-apparatus at the position where short-range wireless communication between the self-apparatus and the communication counterpart apparatus is possible.

(5) The information processing apparatus according to any one of (1) through (4), in which the alignment image includes an image that includes the communication counterpart apparatus captured by the camera of the self-apparatus.

(6) The information processing apparatus according to any one of (1) through (5), in which the alignment image includes an image resulting from cutting out only a partial region from an image that includes the communication counterpart apparatus captured by the camera of the self-apparatus.

(7) The information processing apparatus according to any one of (1) through (6), in which the control unit generates the alignment image from an image of the communication counterpart apparatus.

(8) The information processing apparatus according to (7), in which the image of the communication counterpart apparatus includes an image that is obtained from an external unit.

(9) The information processing apparatus according to (7) or (8), in which the control unit generates the alignment image on the basis of the position of the communication unit of the communication counterpart apparatus included in the image of the communication counterpart apparatus and the position of the camera and the position of the communication unit of the self-apparatus which are stored in a storage unit of the self-apparatus.

(10) An information processing apparatus including:

a control unit that generates an alignment image that is to be presented to a user at a time of aligning a position of a communication unit of the self-apparatus that performs short-range wireless communication with a position of a communication unit of a communication counterpart apparatus, in which the control unit generates, as the alignment image, an image captured by the camera of the self-apparatus at a position where short-range wireless communication between the self-apparatus and the communication counterpart apparatus is possible, or a partial cutout image of this image.

(11) The information processing apparatus according to (10), in which the control unit generates the alignment image on the basis of the position of the communication unit of the communication counterpart apparatus included in the image of the communication counterpart apparatus and a position of the camera and the position of the communication unit of the self-apparatus which are stored in a storage unit of the self-apparatus.

(12) An information processing method executed at an information processing apparatus, in which the information processing apparatus includes a control unit that displays, on a display unit, an image to be presented to a user at a time of aligning a position of a communication unit of the self-apparatus that performs short-range wireless communication with a position of a communication unit of a communication counterpart apparatus, and the control unit overlappingly displays, on the display unit, an alignment image captured by a camera of the self-apparatus at a position where short-range wireless communication between the self-apparatus and the communication counterpart apparatus is possible, and a live view image which is a current captured image according to the camera of the self-apparatus.

(13) An information processing method executed at an information processing apparatus, in which the information processing apparatus includes a control unit that generates an alignment image that is to be presented to a user at a time of aligning a position of a communication unit of the self-apparatus that performs short-range wireless communication with a position of a communication unit of a communication counterpart apparatus, and the control unit generates, as the alignment image, an image captured by a camera of the self-apparatus at a position where short-range wireless communication between the self-apparatus and the communication counterpart apparatus is possible, or a partial cutout image of this image.

(14) A program that causes information processing to be executed in an information processing apparatus, in which the information processing apparatus includes a control unit that displays, on a display unit, an image to be presented to a user at a time of aligning a position of a communication unit of the self-apparatus that performs short-range wireless communication with a position of a communication unit of a communication counterpart apparatus, and the program, at the control unit, causes the display unit to overlappingly display an alignment image captured by a camera of the self-apparatus at a position where short-range wireless communication between the self-apparatus and the communication counterpart apparatus is possible, and a live view image which is a current captured image according to the camera of the self-apparatus.

(15) A program that causes information processing to be executed in an information processing apparatus, in which the information processing apparatus includes a control unit that generates an alignment image that is to be presented to a user at a time of aligning a position of a communication unit of the self-apparatus that performs short-range wireless communication with a position of a communication unit of a communication counterpart apparatus, and the program causes the control unit to generate an image captured by a camera of the self-apparatus at a position where short-range wireless communication between the self-apparatus and the communication counterpart apparatus is possible or a partial cutout image of this image, as the alignment image.

In addition, a series of processing described in the specification can be executed by hardware, software, or a composite configuration of these two. In a case of executing processing by software, it is possible to install a program in which a processing sequence is recorded into a memory of a computer incorporated by dedicated hardware and cause the program to be executed, or install the program into a general-purpose computer that can execute various types of processing and cause the program to be executed. For example, the program can be recorded in advance in a recording medium. In addition to performing installation from a recording medium to a computer, it is possible to receive the program via a network such as a LAN (Local Area Network) or the Internet, and install the program into a recording medium such as a hard disk that is built in.

Note that various types of processing described in the specification are not only executed in chronological order according to the description, but may be executed in parallel or separately, as necessary or according to the processing capability of an apparatus that executes the processing. In addition, a system in the present specification is a logical collective configuration of a plurality of apparatuses, and is not limited to each apparatus of the configuration being inside the same housing.

INDUSTRIAL APPLICABILITY

As described above, by virtue of the configuration of an embodiment of the present disclosure, an apparatus and a method that enable alignment for communication, in which short-range wireless communication is performed, to be performed easily and with high accuracy are realized.

Specifically, for example, the apparatus and the method have a control unit that displays on a display unit an image to be presented to a user at a time of aligning a position of a communication unit of the self-apparatus that performs short-range wireless communication with a position of a communication unit of a communication counterpart apparatus. The control unit performs an overlappingly display on the display unit of an alignment image captured by a camera of the self-apparatus at a position where short-range wireless communication between the self-apparatus and the communication counterpart apparatus is possible, and a live view image which is a current captured image according to the camera of the self-apparatus. The control unit displays outline data or transparent data for the alignment image on the display unit.

By the present configuration, an apparatus and a method that enable alignment for communication, in which short-range wireless communication is performed, to be performed easily and with high accuracy are realized.

REFERENCE SIGNS LIST

10 Image capturing apparatus
11 Proximity communication unit
20 Smartphone
21 Proximity communication unit
22 Camera lens
23 Display unit
51 Alignment image
72 Alignment image
100 Information processing apparatus
101 Camera
102 Image processing unit
103 Display unit
104 Control unit
105 Input unit
106 Storage unit
107 Proximity communication unit
108 Communication unit
211 Image capturing apparatus image
212 Alignment image
251 Server
301 CPU
302 ROM
303 RAM
304 Bus
305 Input/output interface
306 Input unit
307 Output unit
308 Storage unit
309 Communication unit
310 Drive
311 Removable media

The invention claimed is:

1. An information processing apparatus, comprising:
a control unit configured to:
    display on a display unit, an image to be presented to a user at a time of aligning a position of a communication unit of the information processing apparatus that performs short-range wireless communication with a position of a communication unit of a communication counterpart apparatus; and
    overlappingly display, on the display unit, an alignment image captured by a camera of the information processing apparatus at a position where the short-range wireless communication between information processing apparatus and the communication counterpart apparatus is possible, and a live view image which is a current captured image according to the camera of the information processing apparatus.

2. The information processing apparatus according to claim 1, wherein
the control unit is further configured to overlappingly display, on the display unit, outline data for the alignment image on the live view image.

3. The information processing apparatus according to claim 1, wherein
the control unit is further configured to overlappingly display, on the display unit, transparent data for the alignment image on the live view image.

4. The information processing apparatus according to claim 1, wherein
the control unit is further configured to execute processing that stores, in a storage unit, the alignment image captured by the camera of the information processing apparatus at the position where the short-range wireless communication between the information processing apparatus and the communication counterpart apparatus is possible.

5. The information processing apparatus according to claim 1, wherein
the alignment image includes an image that includes the communication counterpart apparatus captured by the camera of the information processing apparatus.

6. The information processing apparatus according to claim 1, wherein
the alignment image includes an image resulting from cutting out only a partial region from an image that includes the communication counterpart apparatus captured by the camera of the information processing apparatus.

7. The information processing apparatus according to claim 1, wherein
the control unit is further configured generate the alignment image from an image of the communication counterpart apparatus.

8. The information processing apparatus according to claim 7, wherein
the image of the communication counterpart apparatus includes an image that is obtained from an external unit.

9. The information processing apparatus according to claim 7, wherein
the control unit is further configured to generate the alignment image based on the position of the communication unit of the communication counterpart apparatus, included in the image of the communication counterpart apparatus, and the position of the camera and the position of the communication unit of the information processing apparatus which are stored in a storage unit of the information processing apparatus.

10. An information processing apparatus, comprising:
a control unit
generate an alignment image that is to be presented to a user at a time of aligning a position of a communication unit of the information processing apparatus that performs short-range wireless communication with a position of a communication unit of a communication counterpart apparatus, wherein
the control unit is configured to generate, as the alignment image, at least one of an image captured by a camera of the information processing apparatus at a position where the short-range wireless communication between the information processing apparatus and the communication counterpart apparatus is possible, or a partial cutout image of the captured image.

11. The information processing apparatus according to claim 10, wherein
the control unit is further configured to generate the alignment image based on at least one of the position of the communication unit of the communication counterpart apparatus, included in the image of the communication counterpart apparatus, and a position of the camera and the position of the communication unit of the information processing apparatus which are stored in a storage unit of the information processing apparatus.

12. An information processing method, comprising:
in an information processing apparatus:
controlling display, on a display unit, an image to be presented to a user at a time of aligning a position of a communication unit of the information processing apparatus that performs short-range wireless communication with a position of a communication unit of a communication counterpart apparatus; and
overlappingly display, on the display unit, an alignment image captured by a camera of the information processing apparatus at a position where the short-range wireless communication between the information processing apparatus and the communication counterpart apparatus is possible, and a live view image which is a current captured image according to the camera of the information processing apparatus.

13. An information processing method, comprising:
in an information processing apparatus:
generating, by a control unit, an alignment image that is to be presented to a user at a time of aligning a position of a communication unit of the information processing apparatus that performs short-range wireless communication with a position of a communication unit of a communication counterpart apparatus, wherein
the control unit generates, as the alignment image, at least one an image captured by a camera of the information processing apparatus at a position where the short-range wireless communication between the information processing apparatus and the communication counterpart apparatus is possible, or a partial cutout image of the captured image.

14. A non-transitory computer-readable medium having stored thereon, computer-readable instructions which, when executed by a processor of an information processing apparatus, cause the processor to execute operations, the operations comprising:
controlling display, on a display unit, an image to be presented to a user at a time of aligning a position of a communication unit of the information processing apparatus that performs short-range wireless communication with a position of a communication unit of a communication counterpart apparatus; and
overlappingly display, on the display unit, an alignment image captured by a camera of the information processing apparatus at a position where the short-range wireless communication between the information processing apparatus and the communication counterpart apparatus is possible, and a live view image which is a current captured image according to the camera of the information processing apparatus.

15. A non-transitor computer-readable medium having stored thereon, computer-readable instructions which, when executed by a processor of an information processing apparatus, cause the processor to execute operations, the operations comprising:

generating, by a control unit, an alignment image that is to be presented to a user at a time of aligning a position of a communication unit of the information processing apparatus that performs short-range wireless communication with a position of a communication unit of a communication counterpart apparatus, when the control unit generats, as the alignment image, at least one of an image captured by a camera of the information processing apparatus at a position where the short-range wireless communication between the information processing apparatus and the communication counterpart apparatus is possible, or a partial cutout image of the captured image.

* * * * *